US012783867B2

(12) United States Patent
Seow

(10) Patent No.: US 12,783,867 B2
(45) Date of Patent: Nov. 3, 2026

(54) METHOD AND SYSTEM FOR COGNITIVE INFORMATION PROCESSING USING REPRESENTATION LEARNING AND DECISION LEARNING ON DATA

(71) Applicant: Intellective Ai, Inc., Addison, TX (US)

(72) Inventor: Ming-Jung Seow, The Woodlands, TX (US)

(73) Assignee: Intellective Ai, Inc., Addison, TX (US)

( * ) Notice: Subject to any disclaimer, the term of this patent is extended or adjusted under 35 U.S.C. 154(b) by 1170 days.

(21) Appl. No.: 17/506,258

(22) Filed: Oct. 20, 2021

(65) Prior Publication Data

US 2022/0121942 A1 Apr. 21, 2022

Related U.S. Application Data

(60) Provisional application No. 63/094,095, filed on Oct. 20, 2020.

(51) Int. Cl.
*G06N 3/08* (2023.01)
*G06N 3/042* (2023.01)

(52) U.S. Cl.
CPC ............... *G06N 3/08* (2013.01); *G06N 3/042* (2023.01)

(58) Field of Classification Search
CPC ................................ G06N 3/08; G06N 3/042
See application file for complete search history.

(56) References Cited

U.S. PATENT DOCUMENTS

| | | | | |
|---|---|---|---|---|
| 9,639,521 | B2 | 5/2017 | Seow et al. | |
| 2005/0171948 | A1* | 8/2005 | Knight | G06F 16/313 707/E17.084 |
| 2009/0016600 | A1* | 1/2009 | Eaton | G06V 20/47 382/103 |
| 2011/0052000 | A1* | 3/2011 | Cobb | G06V 10/764 382/103 |

(Continued)

FOREIGN PATENT DOCUMENTS

WO WO-2022087120 A1 4/2022

OTHER PUBLICATIONS

Vu, L., Nguyen, Q. U., Nguyen, D. N., Hoang, D. T., & Dutkiewicz, E. (Sep. 2020). Learning latent representation for IoT anomaly detection. IEEE Transactions on Cybernetics, 52(5), 3769-3782. (Year: 2020).*

(Continued)

*Primary Examiner* — Michael J Huntley
*Assistant Examiner* — Maggie Thanh Maido
(74) *Attorney, Agent, or Firm* — COOLEY LLP

(57) ABSTRACT

Self-supervised machine learning is performed based on metadata that is acquired in real time and/or offline, via a single data source or multiple data sources. A cognitive analytics system (CAS) performs learning, based on metadata associated with structured and/or un-structured data, to generate data representations for use in decision learning. A cognitive engine compares the data representations to learned patterns stored in memory, for example as weights. Data can be transformed into representations, and condition (s) may be generated based on new data received from a behavioral network. Codelets matching the condition(s) can then be executed, as part of cognitive analytics, to perform pattern association with stored weights and/or inferences.

12 Claims, 32 Drawing Sheets

(56) References Cited

U.S. PATENT DOCUMENTS

| | | | | |
|---|---|---|---|---|
| 2015/0046155 | A1* | 2/2015 | Seow | G06N 3/088 704/10 |
| 2017/0293609 | A1* | 10/2017 | Seow | G06N 3/04 |
| 2019/0095417 | A1* | 3/2019 | Xu | G06F 40/211 |
| 2019/0172449 | A1 | 6/2019 | Xu et al. | |
| 2020/0192927 | A1* | 6/2020 | Chawla | G06N 3/084 |
| 2021/0049700 | A1* | 2/2021 | Nguyen | G06N 3/044 |

OTHER PUBLICATIONS

Nakahata, M. T., Thomaz, L. A., da Silva, A. F., da Silva, E. A., & Netto, S. L. (Mar. 2017). Anomaly detection with a moving camera using spatio-temporal codebooks. Multidimensional Systems and Signal Processing, 29(3), 1025-1054. (Year: 2017).*

Bahrampour, S. et al., "Multimodal Task-Driven Dictionary Learning for Image Classification," IEEE Transactions on Image Processing, vol. 25, No. 1, Jan. 2016, pp. 24-38.

International Search Report and Written Opinion for International Application No. PCT/US2021/055830, mailed Feb. 24, 2022, 16 pages.

International Preliminary Report on Patentability for International Application No. PCT/US2021/055830, by Intellective Ai, Inc., mailed May 4, 2023, 12 pages.

* cited by examiner

Representation Learning Connectionist

Information Processing for Pattern Association, Classification, and Recognition

METHOD AND SYSTEM FOR COGNITIVE INFORMATION PROCESSING USING REPRESENTATION LEARNING AND DECISION LEARNING ON DATA

CROSS-REFERENCE TO RELATED APPLICATIONS

This application claims priority to and benefit of U.S. Provisional Patent Application No. 63/094,095, filed on Oct. 20, 2020 and titled "Methods and System for Cognitive Information Processing Using Representation Learning and Decision Learning on Data," the entirety of which is expressly incorporated by reference herein for all purposes.

This application is related to U.S. Patent Application Publication No. 2017/0293609A1, published Oct. 12, 2017 and titled "Methods and Systems Using Cognitive Artificial Intelligence to Implement Adaptive Linguistic Models to Process Data," and is related to U.S. Pat. No. 9,639,521, issued May 2, 2017 and titled "Cognitive Neuro-Linguistic Behavior Recognition System for Multi-Sensor Data Fusion," and is related to U.S. Patent Application Publication No. 2019/0172449, published Jun. 6, 2019 and titled "Methods and Systems for Optimized Selection of Data Features for a Neuro-Linguistic Cognitive Artificial Intelligence System," each of which is incorporated herein by reference in its entirety.

FIELD

The present disclosure is directed to methods and systems for using artificial intelligence to implement a cognitive information processing system. More specifically, in some embodiments, cognitive analytics are performed using representation learning and/or decision learning, for example to process encoding (such as metadata, data structure, code) generated from structured and unstructured data sources (such as image data, video data, table data, text data, and code). Furthermore, in some embodiments, cognitive information processing is performed to generate encoding from representation learning (e.g., using symbols or latent representations of data). Moreover, in some embodiments, cognitive information processing is performed to generate metadata from decision learning (e.g., including ranking, anomaly, prediction, association, recognition, and/or classification). One or more embodiments also include a method and system for cognitive information retrieval using the stored metadata generated from the representation learning and decision learning associated with source data and metadata. Alternatively, or in addition, the method and system can be configured as a recommendation system by implementing one or more embodiments of the disclosed methods.

BACKGROUND

Many currently available surveillance and monitoring systems (e.g., Internet of Things (IoT), information technology security, video surveillance systems, supervisory control and data acquisition (SCADA) systems, and the like) are trained to observe specific activities and alert an administrator after detecting those activities, for example based on predefined rules.

SUMMARY

Methods disclosed herein include data analysis and self-supervised machine learning based on an acquired encoded pattern (e.g., metadata), in real-time and/or in an offline mode, using a single data source or multiple data sources. In some embodiments, a cognitive information processing system ("CIPS") performs learning, based on associating with structured data and/or un-structured data sources, such as vector data, matrix data, image data, video data, and text, to generate one or more data representations for use in decision learning. A cognitive engine (also referred to herein as a cognitive analytics system (CAS)) compares the data representation(s) to learned patterns stored in memory, for example as weights. The memory can include semantic memory, episodic memory, and/or one or more longer-term memories built using artificial intelligence (e.g., neural network, statistical learning, etc.) that are used for associating patterns (e.g., for one or more specified workspaces). Data can be transformed into representations, and condition (s) may be generated based on new data received from a behavioral network. As used herein, a "condition" is a true/false expression based on one or more activities in a workspace, and can be used to trigger the selection of one or more codelets. Examples of conditions include, but are not limited to: fetching data from the memory, decoding data for instruction/condition, executing instruction/condition with data for functions such as similarity measures or pattern associations. Codelets associated with the condition(s) (e.g., in accordance with one or more rule sets) can then be executed, as part of cognitive analytics, to perform pattern association with stored weights and/or inferences. A codelet may include code for evaluating an expression (e.g., f(x), f(g(x)), f(g(h(x))), where f, g, and h are functions). As an example, when a first condition is evaluated with a first codelet (e.g., codelet1=f1(g1(x1)) and a second condition is evaluated with a second codelet (e.g., codelet2=f2(g2(x2)), the evaluations can trigger a further condition (e.g., codelet3=h(codelet1+codelet2)), where the "x" values can be values retrieved from memory e.g., semantic memory, long term memory, etc.). In the foregoing example, codelet1, codelet2, and codelet3 may be the same or may be different from one another, and codelet can be stateful and/or stateless, depending on the configuration.

In some embodiments, a computer-implemented method for implementing a CIPS for processing data is presented. The method includes associating representations of at least one condition to one or more output features, the representations being generated by a representation engine. The method also includes determining whether the at least one condition triggers execution of at least one node from multiple nodes. Each node from the multiple nodes represents a subtask of at least one task from multiple tasks. Each task in the multiple tasks includes an ordered set of subtasks. In addition, the method includes iteratively performing, for each node from the multiple nodes whose execution is triggered: executing that node, including performing the subtasks represented by that node, and determining whether executing that node generates an output. If executing that node does generate an output, the method includes updating the linguistic engine based on the output, generating at least one additional condition based on the output, and determining whether the at least one additional condition triggers execution of at least a second node from the multiple nodes.

In some embodiments, the representation engine tokenizes input data and generates an graph (e.g., an undirected graph), using self-supervised learning at runtime. Statistically significant features are correlated by incrementally combining 1-feature symbols, 2-feature symbols, 3-feature symbols, and/or n-feature symbols, via a learning process, such as representation learning (e.g., using a. symbolic approach), that generates features for use as inputs to a cognitive engine.

In some embodiments, the representation engine generates features by decoding the machine learning model correlating the input and the features, the decoding being performed utilizing an empirical model (e.g., a neural network) generated based on supervised learning such as performing one or more encoding stages and/or decoding stages via a plurality of autoencoders (also referred to herein as a "connectionist learning" approach to generating representations).

In some embodiments, the cognitive engine generates one or more sub-decisions and/or decisions, such as ordering, ranking, classification, and prediction, based on the learned patterns stored in memory, for example as weights, and by evaluating any associated conditions triggering node execution.

In some embodiments, the cognitive engine determines one or more similarity scores for input data, and performs anomaly detection on the input data based on the similarity scores and/or weights retrieved from the representation engine's memory.

In some embodiments, the cognitive engine also generates metadata associated with the input data source, and stores the metadata in a structured database for cognitive information retrieval for descriptive analytics, diagnostic analytics, predictive analytics, and/or prescriptive analytics with query lookup.

In some embodiments, the representation engine output(s) and representations of the associated input data source(s) are stored in a structured database for cognitive information retrieval for descriptive analytics, diagnostic analytics, predictive analytics, and/or prescriptive analytics with query lookup.

In some embodiments, a computer-readable medium includes instructions to cause a processor to implement one or more embodiments of the disclosed method. Alternatively or in addition, a system is configured to implement one or more embodiments of the disclosed methods.

In some embodiments, a computer-implemented method includes receiving input data from a plurality of sensors (e.g., video, motion sensors, light sensors, temperature sensors, pressure sensors, vibration sensors, acoustic sensors, door sensors, infrared sensors, traffic sensors, radio-frequency identification (RFID) sensors, virtual sensors (e.g., buttons, social media hashtags, etc.), Internet of Things (IoT) sensors (which can include one of, or any combination, of the foregoing sensors)), performing representation learning, and generating a decision learning output. As used herein, "IoT sensor" refers to a sensor that is embedded with a physical object, the physical object having a processor and/or software, and/or to a sensor that is virtual (e.g., buttons, social media hashtags, etc.). Performing the representation learning includes associating the input data with at least one latent feature, and grouping the at least one latent feature into at least one feature group. As used herein, a "latent feature" refers to feature data that has been transformed, or example to have a fuzzy value or meaning (e.g., cold, hot, high, low, old, new, etc.). Latent features can include categories and/r activities. At least one latent symbol is assigned to the at least one feature group, and the at least one latent symbol is grouped into at least one symbol group. At least one latent lexicon is assigned to the at least one symbol group, to generate a representation learning output. The generating the decision learning output is based on at least one of: the at least one latent symbol or the at least one latent lexicon. Data associated with a plurality of sensors (e.g., including meta data or/and output data) is compared to the representation learning output and the decision learning output, and the representation learning output is associated with and/or compared to the decision learning output. At least one of indexing, ranking, or sorting of the data associated with the plurality of sensors is performed, based on at least one of the representation learning output or the decision learning output, to produce modified data or code. A representation of at least one condition from a plurality of conditions is generated on based on the representation learning output, and a determination is made as to whether the at least one condition triggers execution of at least one node from a plurality of nodes, where each node from the plurality of nodes represents a subtask of at least one task from a plurality of tasks associated with the plurality of conditions, and each task from the plurality of tasks includes a plurality of subtasks in an order. First metadata and/or output data associated with the input data (e.g., the representation learning output and/or the decision learning output)) and a representation of a sensor from the plurality of sensors that is associated with the first metadata and/or output data, along with the and the modified data, are stored in a structured, queryable database, and second metadata and/or output of a cognitive engine and a representation of a sensor from the plurality of sensors that is associated with the at least one condition are stored in the structured, queryable database.

BRIEF DESCRIPTION OF THE DRAWINGS

The drawings are primarily for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
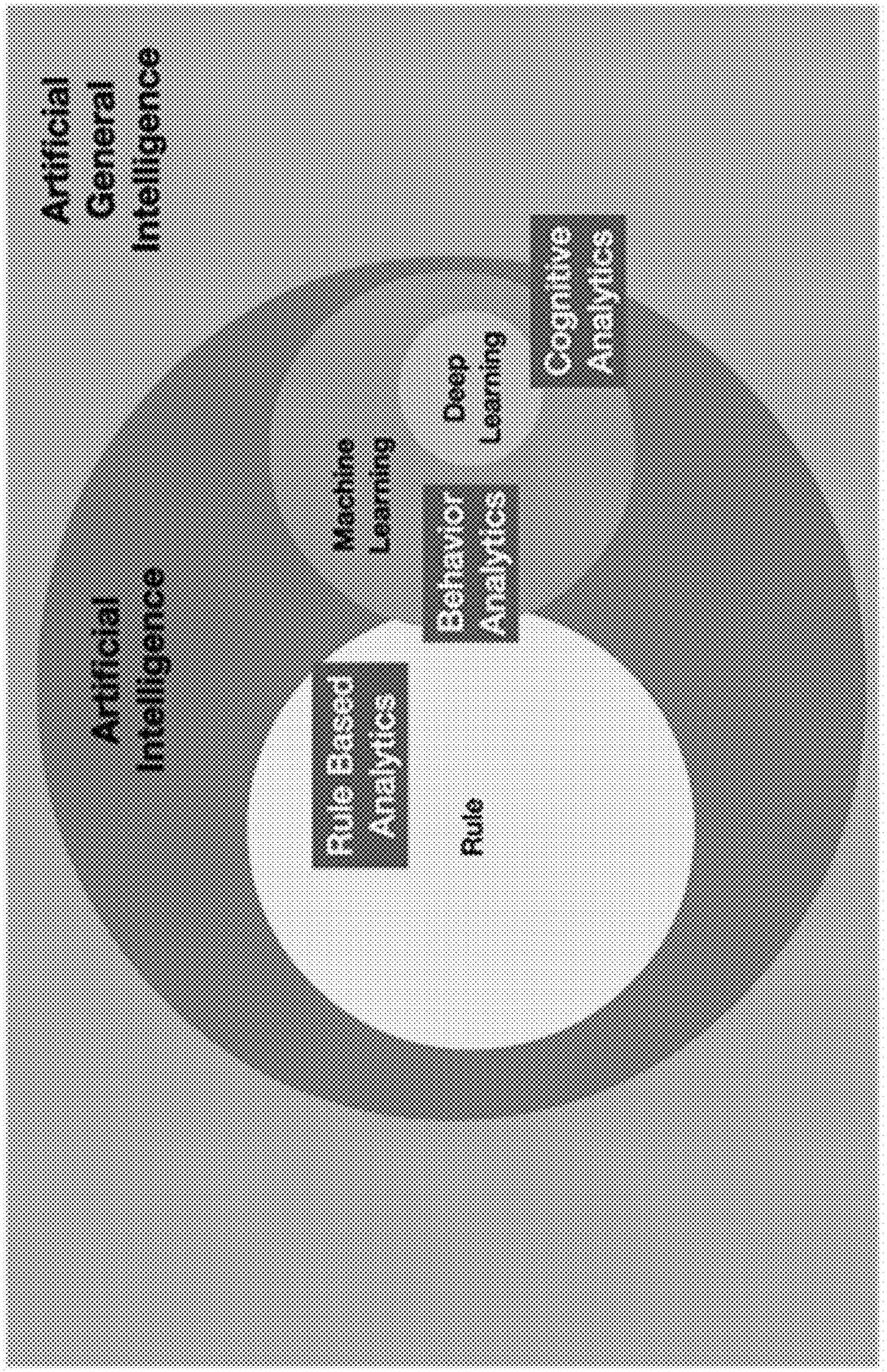
FIG. 1 is a diagram showing relationships between rule based analytics, behavior analytics, and cognitive analytics approaches to artificial intelligence ("AI").

Known rule-based data-monitoring systems typically operate based on advance knowledge of what actions and/or objects to observe. This advance knowledge may be hard-coded into underlying applications, or the system may train itself based on user-provided definitions or rules. Unless the underlying code includes descriptions of rules, activities, behaviors, or cognitive responses for generating a special event notification for a given observation, the typical known rule-based data-monitoring system cannot recognize such behaviors. In other words, unless a given behavior conforms to a predefined rule, occurrences of that behavior can go undetected by the rule-based data-monitoring system. Even if the system trains itself to identify the behavior in some respects, the system is still configured to apply predefined rules to complete the identification. A rules-only-based approach is therefore too rigid for many modern applications, particularly for those where adaptability is desired.

Known behavior-based systems are less rigid than rule-based systems, however, given a behavior-based system that conforms to predefined behaviors, an occurrence of a new behavior can go undetected. For the behavior-based system to learn the behavior, learning behavior would need to be defined in advance.

In view of the foregoing challenges, many rule based and behavior-based approaches to data monitoring are not practical for real world applications and cannot adapt in real time to changing environments when specific rules and/or behaviors have not been defined in advance. Moreover, such systems are difficult to scale, lack robust analytics, and are inflexible in that they cannot recognize rules or behaviors that are novel.

Embodiments set forth herein include a method and an information processing system that overcome the shortcomings of known approaches noted above by analyzing and learning behavior based on acquired/input data. In some embodiments, a representation engine (such as an linguistic engine or other encoder) encodes input data into one or more compact representations for use in higher-order (e.g., cognitive analytics) processing, and a cognitive engine performs decision making based on the compact representation(s). The representation encoding can performed using a neural network, latent semantics, or any other suitable encoder. The representation engine and the cognitive engine can operate sequentially, in parallel, or overlapping in time.

In some embodiments, metadata is identified, encoded and/or generated (e.g., by the representation engine) based on input data from one or more data sources. The one or more data sources can include (but are not limited to) vectors, matrices, tensors, images, video, text, metadata from one or more application drivers (e.g., image metadata, video metadata, or text metadata), metadata from the cognitive information processing system and/or latent semantics. A representation engine can, for example, apply a machine learning process/method (e.g., a self-supervised machine learning method) to the input data to identify the metadata and/or to produce one or more representations (e.g., linguistic representations) of the input data, the representation(s) suitable for subsequent decision learning performed by the cognitive engine. Optionally, the machine learning process/method also outputs one or more conditions (or “rules”) applicable to subsequent codelet selection when criteria of the output are matched with the one or more conditions (e.g., store to memory, retrieve from memory, thresholding, ranking). The machine learning process can include comparing the metadata to learned patterns (e.g., represented as weights) stored in one or more of: semantic memory, episodic memory, longer-term memories, etc. The machine learning process can include the use of a linguistic engine.

In some embodiments, a system includes a representation engine with an encoder and a cognitive engine, and the system is modular in that each of the encoder and the cognitive engine can be independently substituted with different code. For example, a different encoder (e.g., an image detection/classification/segmentation algorithm or software) can be included and/or combined with a representation engine, and/or a convolutional neural network ("CNN") can be included and/or combined with a given first cognitive engine. The combination can be performed prior to or during data monitoring activities. As such, a variety of unique combinations of encoders and cognitive engines can be implemented.

In some embodiments, the cognitive engine performs linear or nonlinear classification of data output from the representation engine. For example, decision nodes (e.g., neurons) of the cognitive engine can process data received from the encoder, for example by firing or not firing (in the case of neurons), to perform anomaly detection, generation of video summaries, indexing of metadata from representation learning associated with one or more sources for a query search (i.e., sources storing data to be queried), indexing metadata from decision learning associated with one or more sources for query search, analysis of semantic memory, and/or deconstruction of a decision-making process. Deconstruction of a decision-making process can include, for example, ranking with what has been defined as "normal"/expected. Alternatively or in addition, deconstruction of a decision-making process can include analyzing input data and associated CNN classifications to identify one or more mechanisms involved in the CNN classification process, for example by associating features of the CNN (such as convolutional kernels or class activation maps) with associated cognitive metadata from representation learning and metadata from decision learning, by correlating one or more features for descriptive analytics.

In some embodiments, a computer-implemented method for implementing a cognitive information processing system to process data includes building a representation engine by generating one or more representations of input data (e.g., encoded versions of the input data stream, which may include metadata) received from a plurality of sensors. The representations are generated by clustering (e.g., sequentially) the input data to produce clusters, and associating the clusters to associated symbols "Q." Each symbol Q can include a one-symbol word or a letter. The symbols Q are then grouped into one-dimensional, two-dimensional, or three-dimensional groupings of variable size, each grouping having a dimension varying from 1 to N, where N is associated with the number of features of the input data. Each grouping of symbols Q is associated with a symbol R. The symbols R are then grouped into groupings of variable size, each grouping having a dimension varying from N to N×M, where M is associated with the number of R symbols. Each grouping of symbols R is associated with a symbol S.

The method also includes building a cognitive engine by generating a representation of at least one condition based on output data (e.g., at least one of the symbols Q, R, or S) generated by the representation engine, and determining whether the at least one condition triggers execution of at least one node from a plurality of nodes. Each node from the plurality of nodes represents a subtask of at least one task from a plurality of tasks, and each task from the plurality of tasks includes an ordered plurality of subtasks. The output of the representation engine and/or of the cognitive engine is stored into a structure database, with a representation of one or more associated input data sources (e.g., sensors from a plurality of sensors), for subsequent query lookup for analysis.

FIG. 1 is a diagram showing relationships between rule-based analytics, behavior analytics, and cognitive analytics approaches to artificial intelligence ("AI"). As shown in FIG. 1, the field of artificial general intelligence includes, within it, the field of AI. The field of AI includes rule-based AI methods and machine learning/statistical analysis AI methods (among others, such as linguistics and semantics). Deep learning is a subset of the machine learning/statistical analysis AI methods subcategory. Rule-based analytics fall entirely within the rule-based AI methods subcategory, whereas behavior analytics can fall under the rule-based AI methods subcategory, the machine learning/statistical analysis AI methods subcategory, or both (see partial overlap between the rule-based AI methods subcategory and the machine learning/statistical analysis AI methods subcategory). Cognitive analytics can include deep learning, other types of machine learning, other types of artificial intelligence, or other types of artificial general intelligence.

Figure 2:
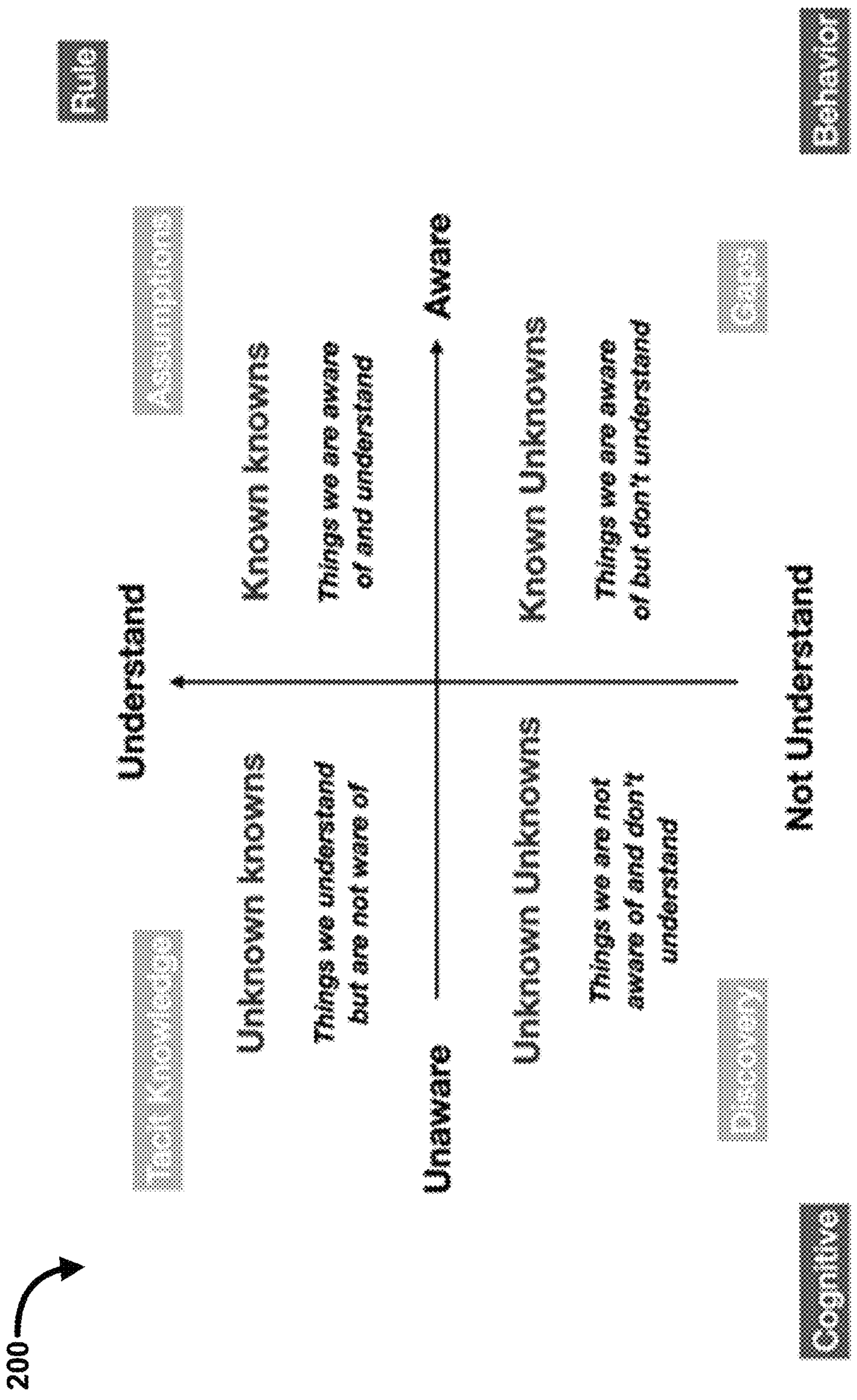
FIG. 2 is a chart showing stages and various types of learning.

FIG. 2 is a chart showing stages and types of learning. As shown in FIG. 2, a vertical axis ranging from not understanding to understanding, and a horizontal axis ranging from unaware to aware define four quadrants. The upper left quadrant represents tacit knowledge and includes things we understand but are not aware of ("unknown knowns"). The upper right quadrant represents assumption and includes things we understand and are aware of ("known knowns"). Rule-based analytics can be performed based on such assumptions. The lower left quadrant represents opportunities for discovery and includes things we do not understand and are not aware of ("unknown unknowns"). Cognitive learning can be used to make such discoveries. The lower right quadrant represents knowledge gaps and includes things we are aware of but do not understand ("known unknowns"). Behavior analytics can be used to make such discoveries.

Figure 3A:
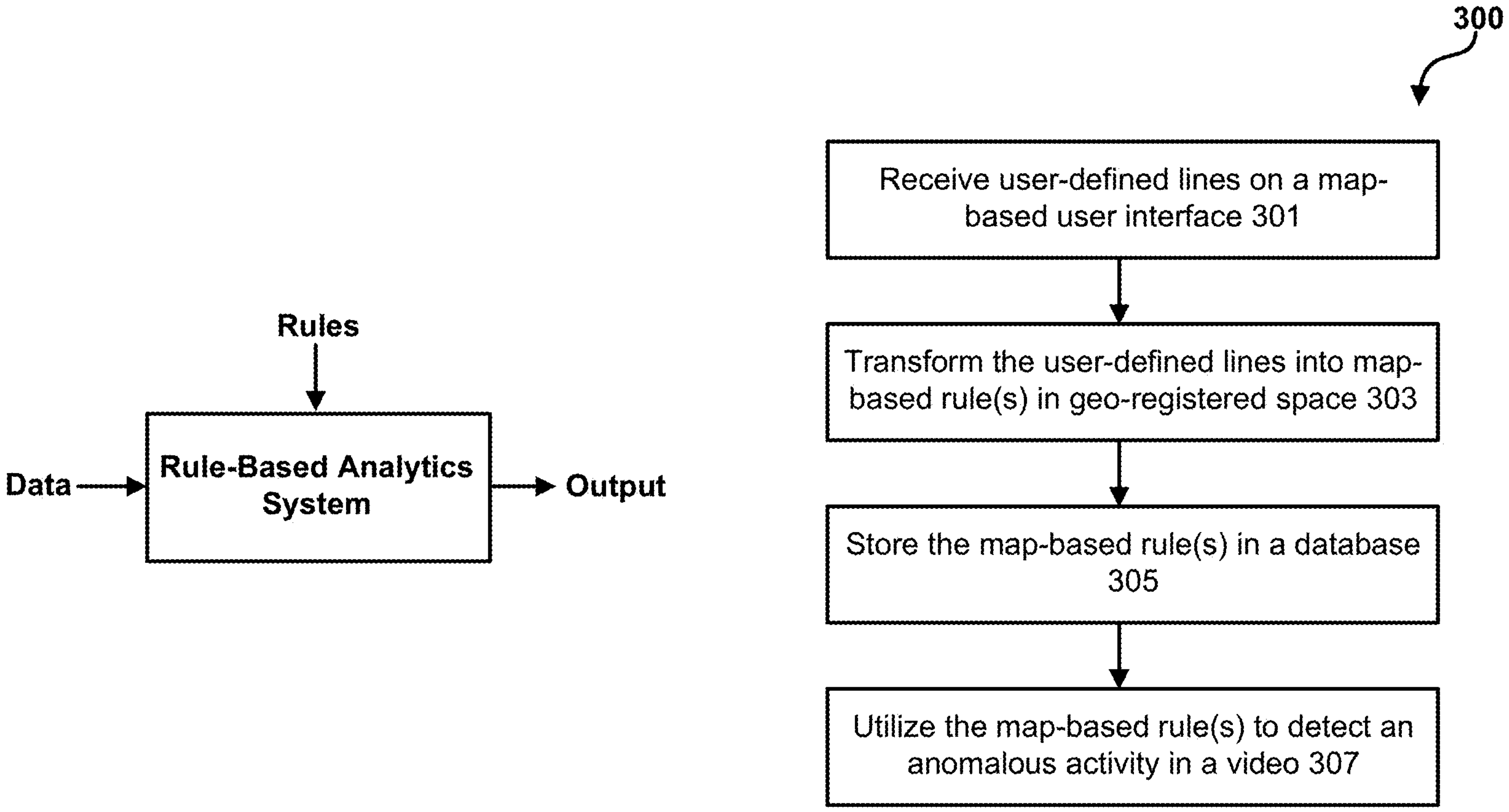
FIG. 3A illustrates an example of a rule based data analytics system and process.

FIG. 3A illustrates an example of a rule-based data analytics system and process. As shown in left side of FIG. 3A, a rule-based data analytics system receives data as an input, applies rules to the data, and produces an output based on the input and the rules. An example rule-based analytics process 300 is shown in the right side of FIG. 3A, and includes receiving user-defined lines on a map-based user interface, at 301. At 303, the user-defined lines are transformed into one or more map-based rules in geo-registered space. The map-based rules are stored in a database, at 305, and the map-based rules are subsequently used to detect anomalous activity in a video at 307.

Figure 3B:
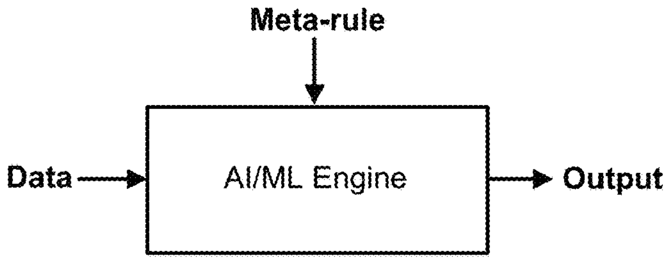
FIG. 3B illustrates an example of a behavior based data analytics system and process.
Figure 3B:
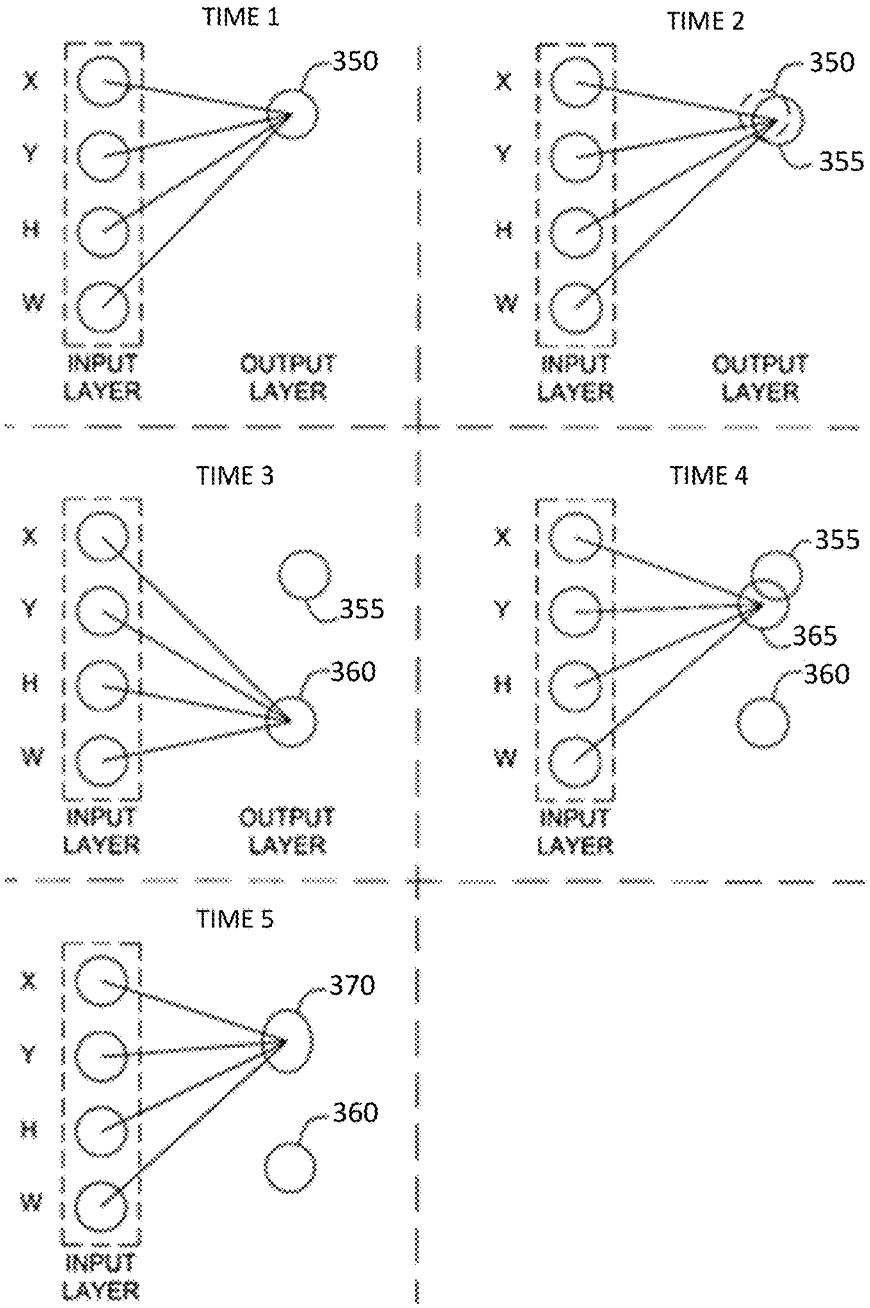

FIG. 3B illustrates an example of a behavior-based data analytics system and process, in accordance with an embodiment. As shown in the top portion of FIG. 3B, an example behavior-based data analytics system includes an AI/machine learning (ML) engine that receives data as an input, applies one or more meta-rules to the input, and produces output based on the input data and the meta-rule(s). The lower portion of FIG. 3B illustrates a graphical representation of clusters in an adaptive resonance theory (ART) network, the clusters generated from video analysis data. In this example, assume the inputs represent the coordinate X, Y positions in a frame of video at which a person is observed, as well as the height and width of that person (in pixels). As shown, at time 1, a set of inputs maps to an initial cluster 350 in an ART network. In this case, cluster 350 represents a prototypical position (and height and width of a person at that position) in this ART network. Initially, the prototypical position may simply be the first set of inputs supplied to the input layer. Thereafter, each time a set of input data is used to update the cluster 350, a mean and variance maintained for the cluster (for each dimension of input data) are updated based on the input data.

Subsequently, at time 2, a second set of input data is supplied to this ART network. Illustratively, the inputs map to the cluster 350, within the limits defined by the variance and choice variable specified for this ART network. Accordingly, the cluster 350 is trained using the set of inputs supplied at time 2, resulting in a cluster 355, at a slightly different position, i.e., a new mean is generated. Conversely, at time 3, a third set of input data is parsed to this ART network. However, the input data results in the creation of a new cluster 360.

At time 4, a set of input data is supplied to the input layer that results in a cluster 365 overlapping with cluster 355. In such a case, as additional input data sets are supplied to this ART network, clusters 355 and 365 may drift closer together—to the point that they overlap by an amount greater than a target percentage of their areas. A target percentage of fifty percent has proven to be effective in some cases. When two clusters overlap by an amount that exceeds the target percentage, the overlapping clusters may be merged. Doing so may help keep the number of distinct clusters managed by the ART network and evaluated by the cluster analysis tool manageable. The results of the merger are shown at time 5, where cluster 370 has an elliptical shape derived form clusters 355 and 365. For example, as noted above, each cluster may have a mean and a variance in each of the X and Y directions. In such a case the mean and variance from cluster 355 and cluster 365 (at time 4) may be used to create a merged cluster 370 shown at time 5.

Figure 3C:
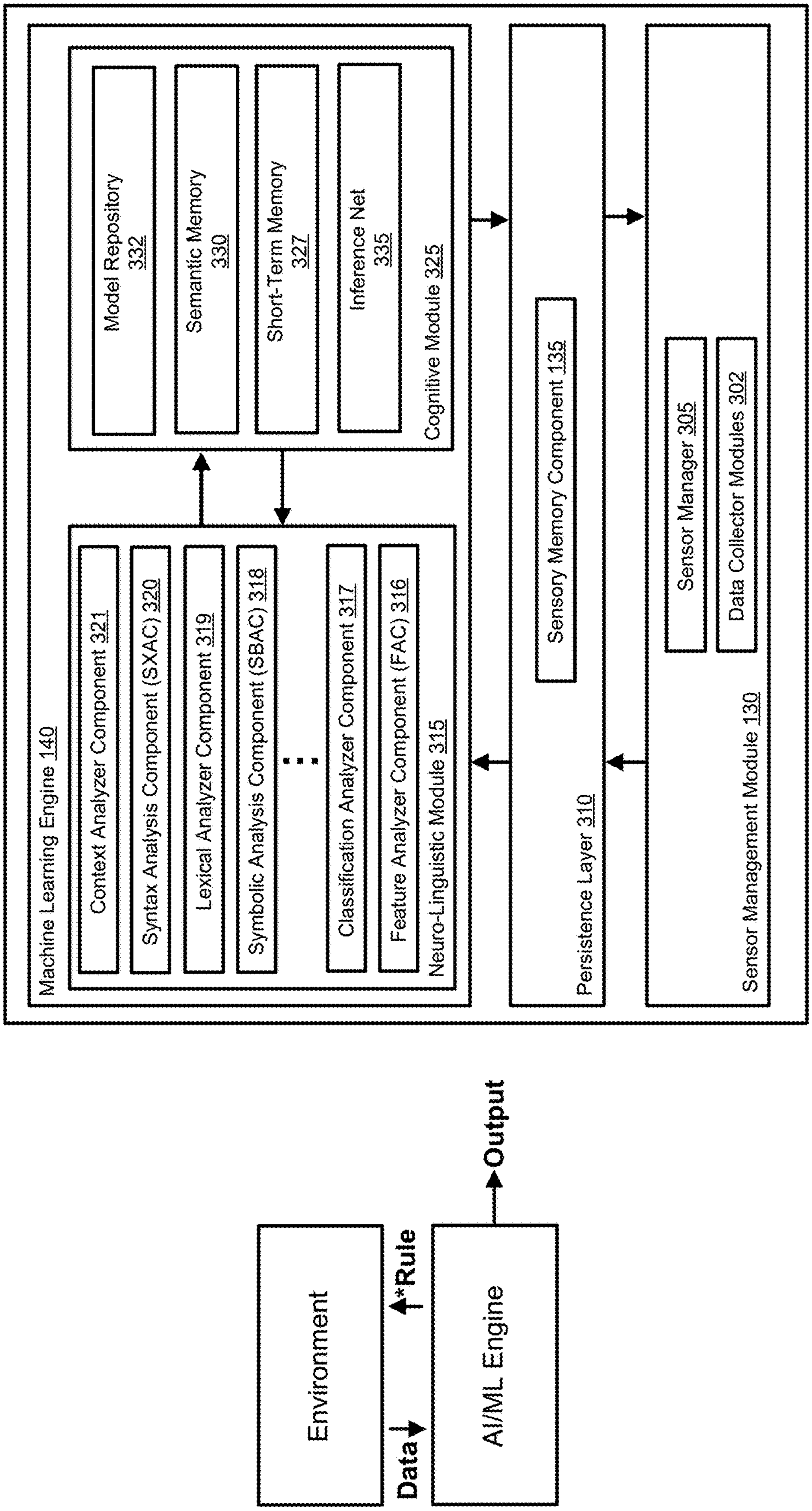
FIG. 3C illustrates an example of a cognitive based data analytics system.

FIG. 3C illustrates example components of a neuro-linguistic cognitive-based AI data analytics system, including a machine learning engine, in accordance with some embodiments. As shown in the left portion of FIG. 3C, the machine learning engine can receive data from an environment (e.g., a network, such as a wireless and/or wired network of compute devices or storage devices such as memory, disk or tape), generate, update, and send rules back to the environment based on the received data, and provide output such as classifications or predictions. As shown in the right portion of FIG. 3C, an example machine learning engine 140 includes a neuro-linguistic module 315 and a cognitive module 325. The neuro-linguistic module 315 performs neural network-based linguistic analysis of normalized input data to build a neuro-linguistic model representation of the observed input data. Rather than describing observed activity based on pre-defined objects and actions, the neuro-linguistic module 315 develops an adaptive feature language based on alpha symbols, betas, and gammas generated from the input data. The neuro-linguistic module 315 includes feature symbols that serve as building blocks for the feature syntax. Feature symbols associated with base features in the data are called alphas. Collections of one or more alphas are called betas or feature words. Collections of betas are called gammas or feature syntax. As shown, the neuro-linguistic module 315 includes a feature analysis component 316, a classification analyzer component 317, a symbolic analysis component (SBAC) 318, a lexical analyzer component 319, and a feature syntax analysis component (SXAC) component 320. Additionally, in some embodiments, the neuro-linguistic module 315 may also include additional modules (i.e., software code), such as a trajectory module, for observing and describing various sequences of activities (e.g., of the same object in time and space, such as a trajectory).

In one embodiment, the Feature Analysis Component (FAC) 316 retrieves the normalized vectors of input data from the sensory memory component 135 and stages the input data in a pipeline architecture (e.g., provided by a graphics processing unit (GPU)). The classification analyzer component 317 evaluates the normalized data organized by the FAC component 316 and maps the data on a neural network. In one embodiment, the neural network may be a combination of a self-organizing map (SOM) and an adaptive resonance theory (ART) network.

The symbolic analysis component 318 clusters the data streams based on values occurring repeatedly in association with one another. Further, the symbolic analysis component 318 generates a set of probabilistic clusters for each input feature. For example, assuming that the input data corresponds to video data, features may include location, velocity, acceleration etc. The symbolic analysis component 318 may generate separate sets of probabilistic clusters for each of these features. Feature symbols (e.g., alpha symbols) are generated that correspond to each statistically relevant probabilistic cluster. The symbolic analysis component 318 learns alpha symbols (i.e., builds an alphabet of alphas) based on the probabilistic clustered input data. That is, the symbolic analysis component 318 generates a set of probabilistic clusters for each input feature. These clusters are tokenized into feature symbols (e.g., alphas). Thus, the symbolic analysis component 318 builds alphabet of alphas based on the probabilistic clustered input data. In one embodiment, the symbolic analysis component 318 may determine a statistical distribution (e.g., mean, variance, and standard deviation) of data in each probabilistic cluster and update the probabilistic clusters as more data is received. The symbolic analysis component 318 may further assign a set of alpha symbols to probabilistic clusters having statistical significance. Each probabilistic cluster may be associated with a statistical significance score that increases as more data that maps to the probabilistic cluster is received. The symbolic analysis component 318 may assign alpha symbols to probabilistic clusters whose statistical significance score exceeds a threshold. Further, each probabilistic cluster may have an associated family of alpha symbols defined by the mean and standard deviation. In some instances, each probabilistic cluster may have a collection of observations and the threshold may be a number relating to such observations. In addition, the symbolic analysis component 318 may decay the statistical significance of a probabilistic cluster as the symbolic analysis component 318 observes data mapping to the probabilistic cluster less often over time. The symbolic analysis component 318 "learns on-line" and may identify new alpha symbols as new probabilistic clusters reach statistical significance and/or merge similar observations to a more generalized cluster, which is then assigned a new alpha symbol. An alpha symbol may generally be described as a letter of an alphabet used to create betas used in the neuro-linguistic analysis of the input data. That is, a set of alphas may describe an alphabet. Alpha(s) can be used to create beta(s) and may be generally described as building blocks of beta(s). An alpha symbol provides a "fuzzy" representation of the data belonging to a given probabilistic cluster.

In one embodiment, the symbolic analysis component 318 may also evaluate an unusualness score for each alpha symbol that is assigned to a probabilistic cluster. The unusualness score may be based on the frequency of a given alpha symbol relative to other alpha symbols observed in the input data stream, over time. In some embodiments, the unusualness score indicates how infrequently a given alpha symbol has occurred relative to past observations. The unusualness score may increase or decrease over time as the neuro-linguistic module 315 receives additional data.

Once a probabilistic cluster has reached statistical significance, the symbolic analysis component 318 sends corresponding alpha symbols to the lexical analyzer component 319 in response to data that maps to that probabilistic cluster. Said another way, once alpha symbol(s) are mapped to a probabilistic cluster that has reached statistical significance, the symbolic analysis component 318 sends the corresponding alpha symbol(s) to the lexical analyzer component 319. In some instances, if a probabilistic cluster does not reach statistical significance the symbolic analysis component 318 may send an unknown symbol to the lexical analyzer component 319. In some embodiments, the symbolic analysis component 318 limits alpha symbols that can be sent to the lexical component 319 to the most statistically significant probabilistic clusters. Note, over time, the most frequently observed alpha symbols may change as probabilistic clusters increase (or decrease) in statistical significance. As such, it is possible for a given probabilistic cluster to lose statistical significance. Over time, thresholds for statistical significance can also increase, and thus, if the amount of observed data mapping to a given probabilistic cluster fails to meet a threshold, then the probabilistic cluster loses statistical significance.

Given the stream of the alpha symbols (e.g., base symbols) and other data such as timestamp data, unusualness scores, and statistical data (e.g., a representation of the probabilistic cluster associated with a given alpha symbol) received from the symbolic analysis component 318, the lexical analyzer component 319 builds a dictionary that includes combinations of co-occurring alpha symbols, e.g., betas, from the alpha symbols transmitted by the symbolic analysis component 318. That is, the lexical analyzer component 319 identifies repeating co-occurrences of alphas and features output from the symbolic analysis component 318 and calculates frequencies of the co-occurrences occurring throughout the alpha symbol stream. The combinations of alpha symbols may represent a particular activity, event, etc. In some embodiments, the lexical analyzer component 319 may limit the length of betas in the dictionary to allow the lexical analyzer component 319 to identify a number of possible combinations without adversely affecting the performance of the neuro-linguistic cognitive-based AI data analytics system. In practice, limiting a beta to a maximum of five or six alpha symbols has shown to be effective. Further, the lexical analyzer component 319 may use level-based learning models to analyze alpha symbol combinations and learn betas. The lexical analyzer component 319 may learn betas, up through the maximum alpha symbol combination length, at incremental levels, i.e., where one-alpha betas are learned at a first level, two-alpha betas are learned at a second level, and so on.

Like the symbolic analysis component 318, the lexical analyzer component 319 is adaptive. That is, the lexical analyzer component 319 may learn and generate betas in the dictionary over time. The lexical analyzer component 319 may also reinforce or decay the statistical significance of betas in the dictionary as the lexical analyzer component 319 receives subsequent streams of alpha symbols over time. Further, the lexical analyzer component 319 may determine an unusualness score for each beta based on how frequently the beta recurs in the data. The unusualness score may increase or decrease over time as the neuro-linguistic module 315 processes additional data. In some embodiments, the unusualness score indicates how infrequently a particular beta has occurred relative to past observations.

In addition, as observations (i.e., alpha symbols) are passed to the lexical analyzer component 319 and identified as a being part of a given beta, the lexical analyzer component 319 may eventually determine that the beta model has matured. Once a beta model has matured, the lexical analyzer component 319 may output observations of those betas in the model to the SXAC component 320. In some embodiments, the lexical analyzer component 319 limits betas sent to the SXAC component 320 to the most statistically relevant betas. In practice, for each single sample, outputting occurrences of the top thirty-two most statistically relevant betas has shown to be effective (while the most frequently occurring betas stored in the models can amount to thousands of betas). Note, over time, the most frequently observed betas may change as the observations of incoming alphas change in frequency (or as new alphas emerge by the clustering of input data by the symbolic analysis component 318).

The SXAC component 320 builds a feature syntax of gammas from the betas output by the lexical analyzer component 319 on the sequence of betas output from the lexical analyzer component 319. In one embodiment, the SXAC component 320 receives the betas identified by the lexical analyzer component 319 and generates a connected graph, where the nodes of the graph represent the betas, and the edges represent a relationship between the betas. The SXAC component 320 may reinforce or decay the links based on the frequency that the betas are connected with one another in a data stream. Thus, the SXAC component 320 can build an un-directed graph, i.e., feature syntax of gammas, based on co-occurrences of betas. In some embodiments, the SXAC component 320 may use a non-graph based approach to build gammas by stacking betas one after another (i.e., iteratively using the lexical analyzer component 319) to construct a layer. Similar to the symbolic analysis component 318 and the lexical analyzer component 319, the SXAC component 320 may also determine an unusualness score for each identified gamma based on how frequently the gamma recurs in the linguistic data. The unusualness score may increase or decrease over time as the neuro-linguistic module 315 processes additional data. Similar to the lexical analyzer component 319, the SXAC component 320 may also limit the length of a given gamma to allow the SXAC component 320 to be able to identify a number of possible combinations without adversely affecting the performance of the neuro-linguistic cognitive-based AI data analytics system.

As discussed, the SXAC component 320 identifies feature syntax gammas over observations of betas output from the lexical analyzer component 319. As observations of betas accumulate, the SXAC component 320 may determine that a given gamma has matured, i.e., a gamma has reached a measure of statistical relevance. The SXAC component 320 then outputs observations of that gamma to the cognitive module 325. The SXAC component 320 sends data that includes a stream of the alpha symbols, betas, gammas, timestamp data, unusualness scores, and statistical calculations to the cognitive module 325. That is, after maturing, the alphas, betas, and gammas generated by the neuro-linguistic module 315 form a semantic memory 330 of the input data that the neuro-linguistic cognitive-based AI data analytics system uses to compare subsequent observations of alphas, betas, and gammas against the mature semantic memory. The neuro-linguistic module 315 may update the linguistic model as new data is received. Further, when the neuro-linguistic module 315 receives subsequently normalized data, the module 315 can output an ordered stream of alpha symbols, betas, and gammas, all of which can be compared to the semantic memory 330 that has been generated to identify interesting patterns or detect deviations occurring in the stream of input data.

The context analyzer component 321 builds a higher order feature context from collections of gamma elements received from the syntax analyzer component. In one embodiment, analyzing trajectory is one of the core functions of the context analyzer component. Analyzing trajectory includes learning and/or inferring based on a time sequence of alphas, betas, or gammas. This builds a higher level of models by incorporating the temporal patterns and dependency among features or combination of features. A non-limiting example of trajectory analysis includes observing a video scene including cars and people. In particular, observing various tracks of cars and tracks of people in the video scene to identify clustering patterns of these tracks.

Thus, the neuro-linguistic module 315 generates a lexicon, i.e., builds a feature dictionary, of observed combinations of feature symbols/alphas (i.e., feature words/betas), based on a statistical distribution of feature symbols identified in the input data. Specifically, the neuro-linguistic module 315 may identify patterns of feature symbols associated with the input data at different frequencies of occurrence. Further, the neuro-linguistic module 315 can identify statistically relevant combinations of feature symbols at varying lengths (e.g., from one-symbol to collections of multiple symbol feature word length). The neuro-linguistic module 315 may include such statistically relevant combinations of feature symbols in a feature dictionary used to identify feature syntax.

The cognitive module 325 performs learning and analysis on the linguistic content (i.e., the identified alpha symbols, betas, gammas) produced by the neuro-linguistic module 315 by comparing new data to learned patterns in the models kept in memory and then estimating the unusualness of the new data. As shown, the cognitive module 325 includes a short-term memory 327, a semantic memory 330, a model repository 332, and an inference network 335. The semantic memory 330 stores a stable neuro-linguistic model generated by the neuro-linguistic module 315, i.e., stable copies from the symbolic analysis component 318, lexical analyzer component 319, and the SXAC component 320. The stable neuro-linguistic model may be similar to, or the same as, the neuro-linguistic module 315, but is updated less frequently, and changes less frequently. The inference network 335 may compare the stored copies of the models with each other and with the current models to detect changes over time, as well as create, use, and update current and stored models in the short-term memory 327, semantic memory 330, and model repository 332 to generate special event notifications when unusual or anomalous behavior is observed, as discussed in greater detail below.

In one embodiment, the short-term memory 327 may be implemented in one or more GPU(s) (e.g., in Compute Unified Device Architecture ("CUDA")), and the short-term memory 327 may be a hierarchical key-value data store. In contrast, the semantic memory 330 may be implemented in computer memory and include a sparse distributed memory for storing models attaining statistical confidence thresholds from the short-term memory 327. The model repository 332 is a longer-term data store that stores models attaining statistical confidence thresholds from the semantic memory 330, and the model repository 332 may be implemented in the computer memory (e.g., a disk drive or a solid-state device). It should be understood that models stored in the semantic memory 330 and the model repository 332 may be generalizations including encoded data that is more compact than raw observational data. For example, the semantic memory 330 may be an episodic memory that stores linguistic observations related to a particular episode in the immediate past and encodes specific details, such as the "what" and the "when" of a particular event. The model repository 332 may instead store generalizations of the linguistic data with particular episodic details stripped away.

In another embodiment, a database (e.g., a Mongo database) distinct from the model repository 332 may also be used to store copies of models attaining statistical confidence thresholds. In yet another embodiment, the inference network 335 may have direct access to only the short-term memory 327, and data that is needed from longer-term memories such as the semantic memory 330 may be copied to the short-term memory 327 for use by the inference network 335.

Figure 4:
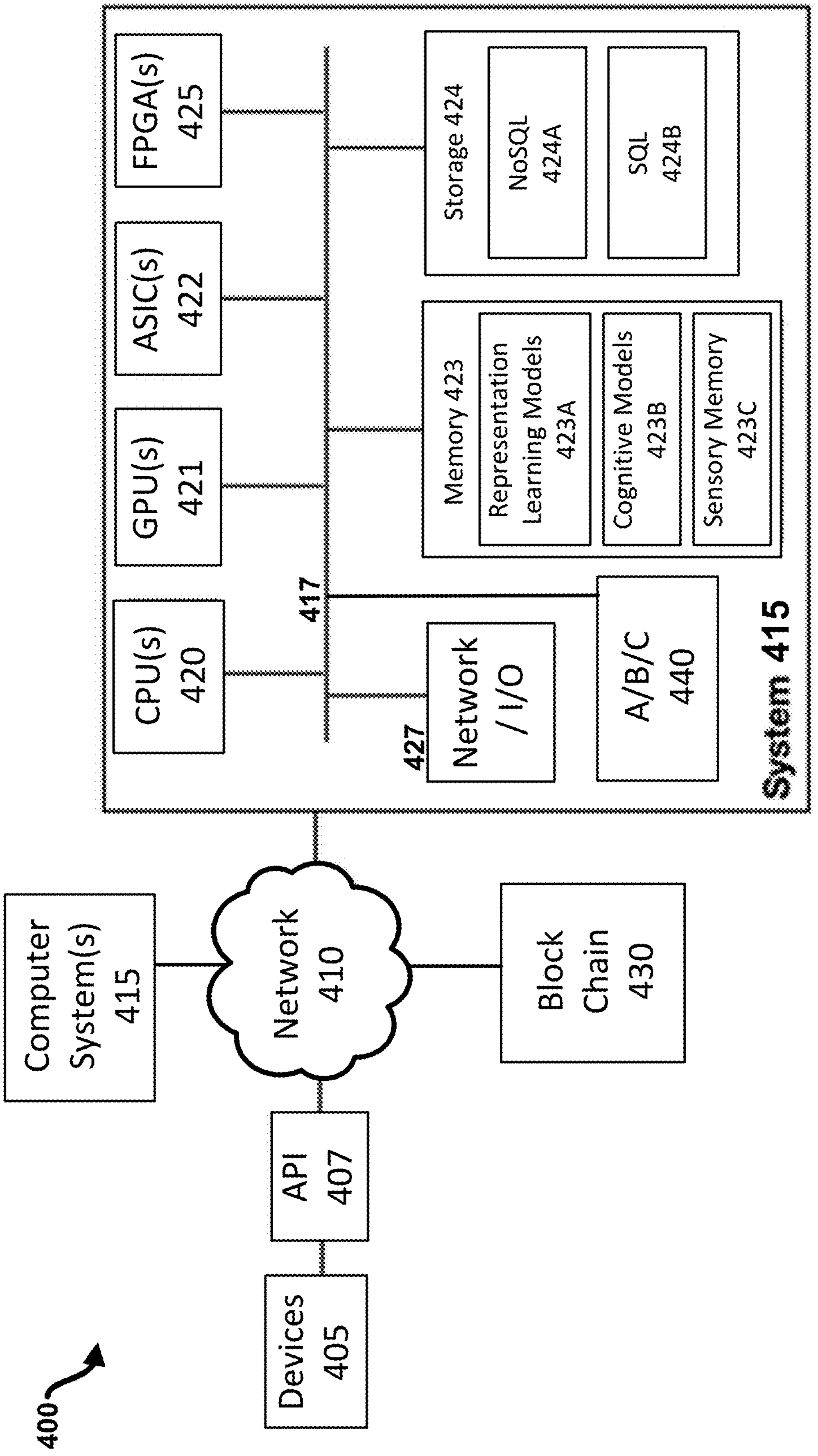
FIG. 4 is a diagram showing components of a cognitive analytics system, according to an embodiment.

FIG. 4 is a diagram showing components of a cognitive information processing system, according to an embodiment. As shown, the cognitive AI system 400 includes one or more input source devices 405 (e.g., sensor devices such as IoT sensors, computers, smart phones, edge devices), an application programming interface 407, a network 410 (e.g., a wireless or wired communication network), and one or more computer systems 415. The network 410 may transmit data input by the input source devices 405 to the computer system(s) 415. Generally, the computing environment of 400 may include one or more computer systems 415 connected to each other via one or more further networks (e.g., the Internet, wireless network(s), and/or local area network(s)). Alternatively, the computer system(s) 415 may be cloud computing resources connected via the network 410. The computer system(s) 415 include one or more processors/processing units such as one or more central processing units (CPU) 420, optionally one or more GPUs 421, optionally one or more application-specific integrated circuits (ASICs) 322, optionally one or more field programmable gate arrays 425, network and I/O interfaces 427, a storage 424 (e.g., a disk drive, optical disk drive, and the like), and a memory 423 that includes one or more representation learning models 423A (e.g., implemented by a linguistic engine), one or more cognitive models 423B (e.g., implemented by a cognitive engine), and one or more sensory memories 423C. The process labelled A/B/C 440 (e.g., application, API gateway, API) may comprise one or more processes connecting via one or more APIs interacting with one or more of components 423A-423C, one or more of components 424A-424B, one or more computer systems 415, one or more blockchain components 430, and/or one or more other devices 405. The one or more computer systems 415 can include distributed computer systems with multiple nodes for fault tolerance, high availability, high reliability, and high performance for handling processing loads for many devices. The one or more other devices 405 can include one or more connections to multiple sources of input devices (e.g., for smart city applications). The memory 423 may comprise one or more memory devices, such as system memory, a graphics memory, or a random access memory (e.g., DRAM, SRAM, SDRAM). The memory 423 and storage 424 may be coupled to the CPU(s) 420, GPU(s) 421, and network and I/O interfaces 427 across one or more buses 417. The storage 424 includes a NoSQL unstructured database 424A (e.g., a Mongo database) and a structured database (e.g., Structured Query Language (SQL)) data management system software 424B. Additionally, storage 324 may include one or more devices such as a hard disk drive, solid state device (SSD), computer memory (e.g., DRAM, SRAM), GPU video RAM (VRAM) or flash memory storage drive, and may store non-volatile data as needed or desired. In some embodiments, the one or more computer systems 415 include Infrastructure as a Service (IaaS). Alternatively or in addition, in some embodiments, the one or more computer systems 415 include a Platform As A Service (PaaS). Alternatively or in addition, in some embodiments, the one or more computer systems 415 include a Software As A Service (SaaS). Alternatively or in addition, in some embodiments, the one or more computer systems 415 can be configured as a distributed system connecting to a decentralized distributed ledger for blockchain operations by implementing and/or integrating one or more embodiments of the disclosed methods.

The CPU 420 retrieves and executes programming instructions stored in the memory 423 as well as stores and retrieves application data residing in the storage 424. In some embodiments, the GPU 421 implements a CUDA. Further, the GPU 421 is configured to provide general purpose processing using the parallel throughput architecture of the GPU 421 to more efficiently retrieve and execute programming instructions stored in the memory 423 and also to store and retrieve application data residing in the storage 424. The parallel throughput architecture provides thousands of cores for processing the application and input data. As a result, the GPU 421 leverages the thousands of cores to perform read and write operations in a massively parallel fashion. Taking advantage of the parallel computing elements of the GPU 421 allows the cognitive AI system 400 to better process large amounts of incoming data (e.g., input from a video and/or audio source). As a result, the cognitive AI system 400 may scale with relatively less difficulty. In some embodiments, component 423 can be mapped and/or stored in component GPU 421, ASIC 422, and/or FPGA 425 for higher performance and throughput for cognitive information processing.

Note that FIG. 4 illustrates merely one possible arrangement of the cognitive AI system 400. For example, although the input sources devices 405 (e.g., sensor devices) are shown in FIG. 4 as being connected to the computer system 415 via network 410, the network 410 may not always be present (e.g., an input source such as a video camera may be directly connected, without the use of a network, to the computer system 415).

Figure 5:
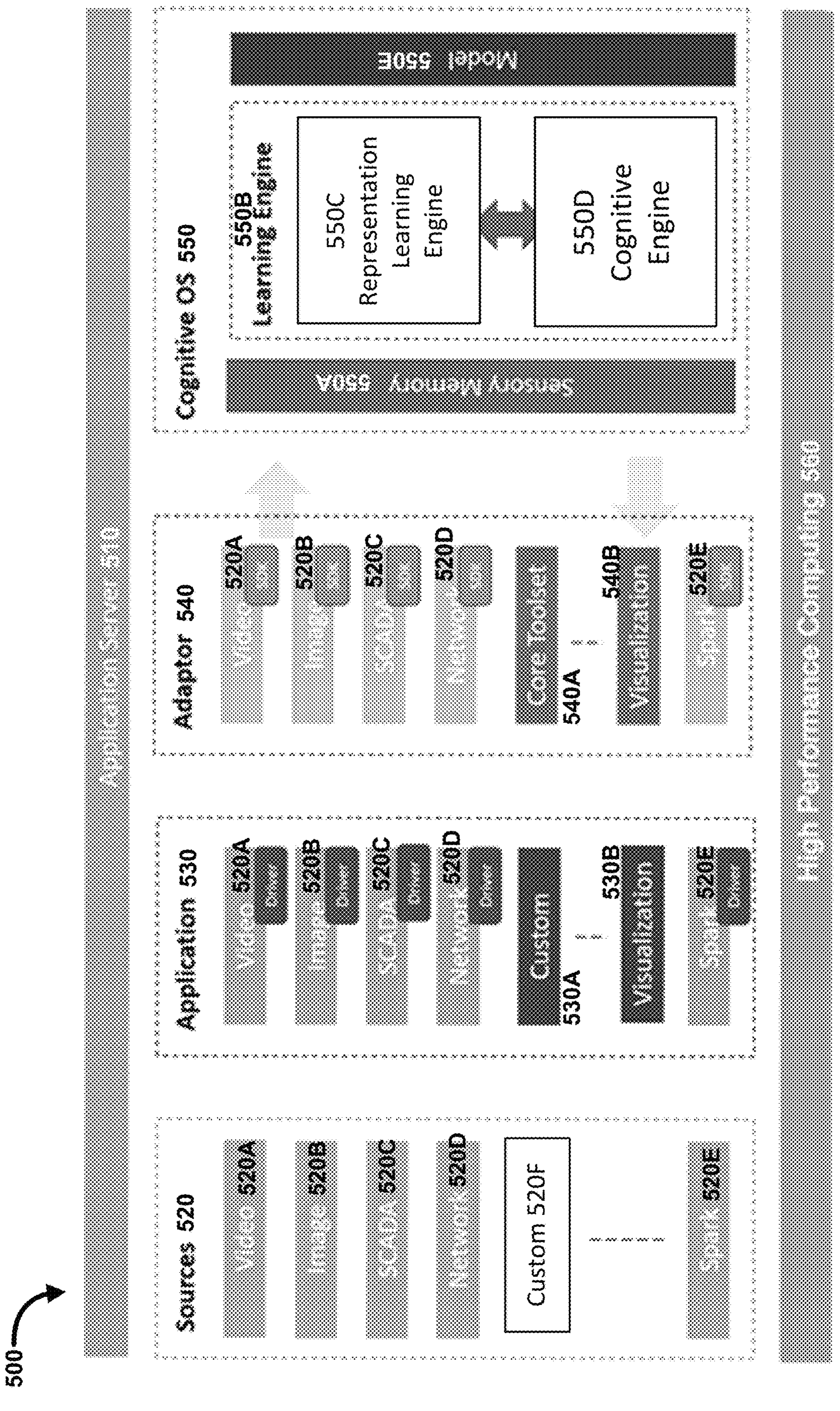
FIG. 5 is a diagram showing an example cognitive AI architecture, according to an embodiment.

FIG. 5 is a diagram showing an example cognitive AI architecture 500, according to an embodiment. As shown in FIG. 5, the cognitive AI architecture 500 includes an application server 510 with multiple data sources 520, software applications 530 (e.g., drivers), adaptors 540, and a cognitive operating system (OS) 550. The data sources 520 include a video data source 520A, an image data source 520B, an Internet of Things (IoT) source 520C (e.g., implemented as a supervisory control and data acquisition (SCADA) control system), a network data source 520D, custom source 520F, and a Spark data source 520E. The software applications 530 include drivers for each of the video metadata source 520A, the image metadata source 520B, the IoT source 520C, the network metadata source 520D, and the Spark data source 520E, as well as one or more custom software applications 530A and one or more data visualization software applications 530B. The adaptors 540 include software development kits (SDKs) for each of the video data source 520A, the image metadata source 520B, the supervisory control and data acquisition (SCADA) source 520C, the network metadata source 520D, and the Spark metadata source 520E, as well as a core toolset 540A and an adaptor 540B for the data visualization software application(s) 530B. The cognitive OS 550 includes a sensory memory 550A (e.g., a memory configured to store sensor data or other input data received from the one or more sources 520), a learning engine 550B having a representation learning engine 550C (e.g., to implement one or more linguistic models 323A of FIG. 3) and a cognitive engine 550D (e.g., to implement one or more cognitive models 323B of FIG. 3), and one or models 550E (e.g., one or more representation learning models 423A of FIG. 4 and/or one or more cognitive models 423B of FIG. 4).

Data can be exchanged between each adaptor from the multiple adaptors 540 and the cognitive OS 550. For example, one or more adaptors from the multiple adaptors 540 can send data from one or more drivers of the multiple applications 530 to the cognitive OS 550. The representation learning engine 550C and the cognitive engine 550D are operably coupled to one another within the learning engine and can also exchange data. The application server 510 (or, each of the sources 520, applications 530, adaptors 540, and the cognitive OS 550, individually) is operably coupled to a high performance computing environment 560 (e.g., a wireless or wired network of compute devices).

Although shown and described as including a video data source 520A, in other embodiments the data sources 520 of the cognitive AI architecture 500 do not include a video data source 520A. Alternatively or in addition, in some embodiments, the data sources 520 do not include a source of time series data.

Although shown and described as including a representation learning engine 550C, in other embodiments the cognitive OS 550 does not include a representation learning engine 550C, and instead includes a different implementation of representation learning (e.g., using an AI symbolic approach and/or an AI connectionist approach). In an AI symbolic approach, strings of characters that represent real-world entities or concepts are processed, and symbols are arranged in structures such as lists, hierarchies, or networks showing how the symbols relate to each other. In an AI connectionist approach, data is sent from one end point to another as previously configured.

Figure 6A:
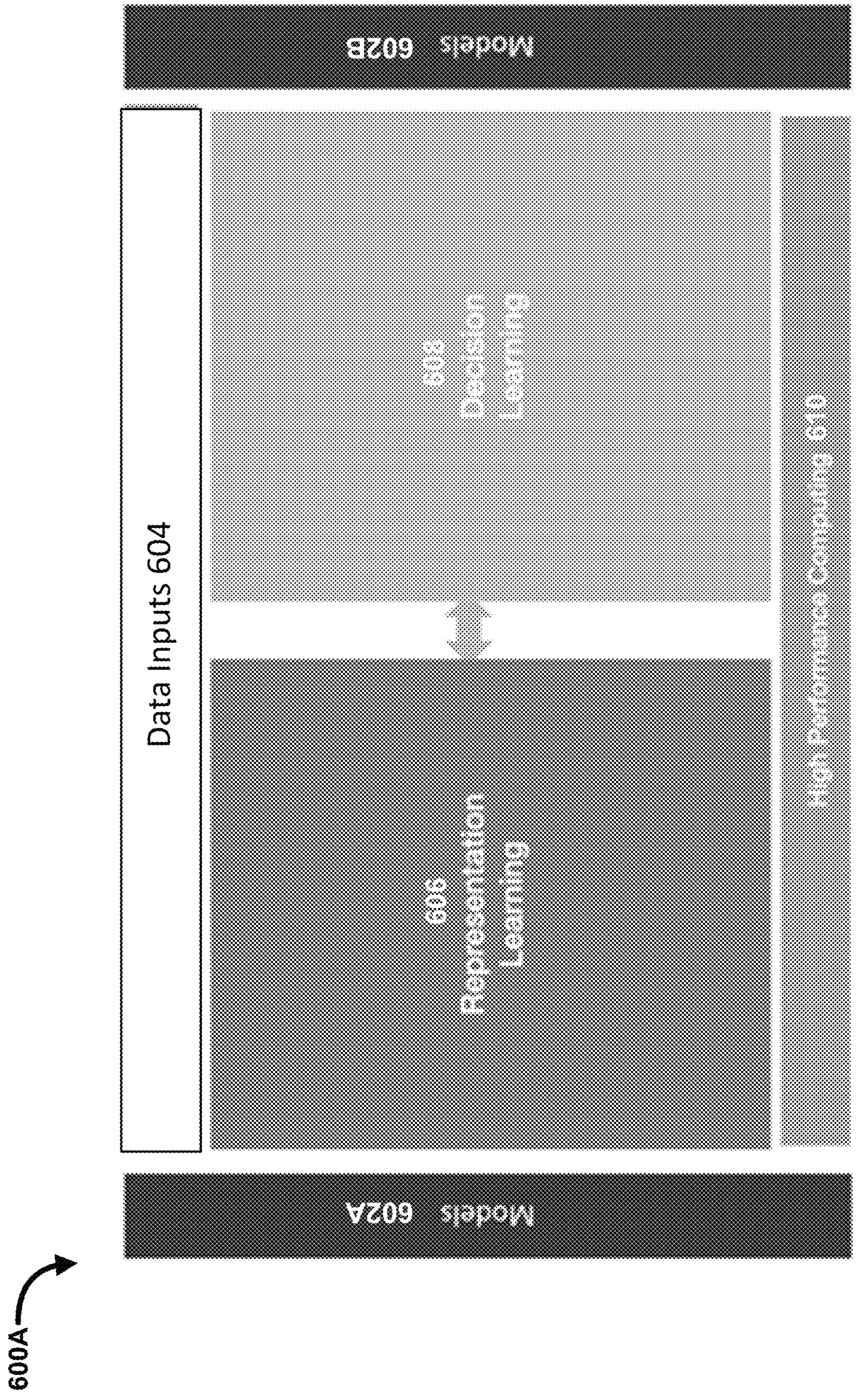
FIG. 6A is a diagram showing an example cognitive operating system for performing cognitive analytics, according to some embodiments.

FIG. 6A is a diagram showing an example cognitive operating system for performing cognitive analytics, according to some embodiments. The cognitive information processing system 600A of FIG. 6A includes models 602A and 602B (e.g., one or more representation learning models 423A of FIG. 4 and/or implement one or more cognitive models 423B of FIG. 4), data inputs 604 (e.g., sensory memory, which can be used to pass data from/to one or more drivers to the cognitive AI), representation learning software 606 (e.g., a linguistic engine, such as representation learning engine 550C of FIG. 5), decision learning software 608 (e.g., a cognitive engine, such as cognitive engine 550D of FIG. 5), and a high performance computing environment 610 (e.g., a wireless or wired network of compute devices), for example similar to the high performance computing environment 560 of FIG. 5.

Figure 6B:
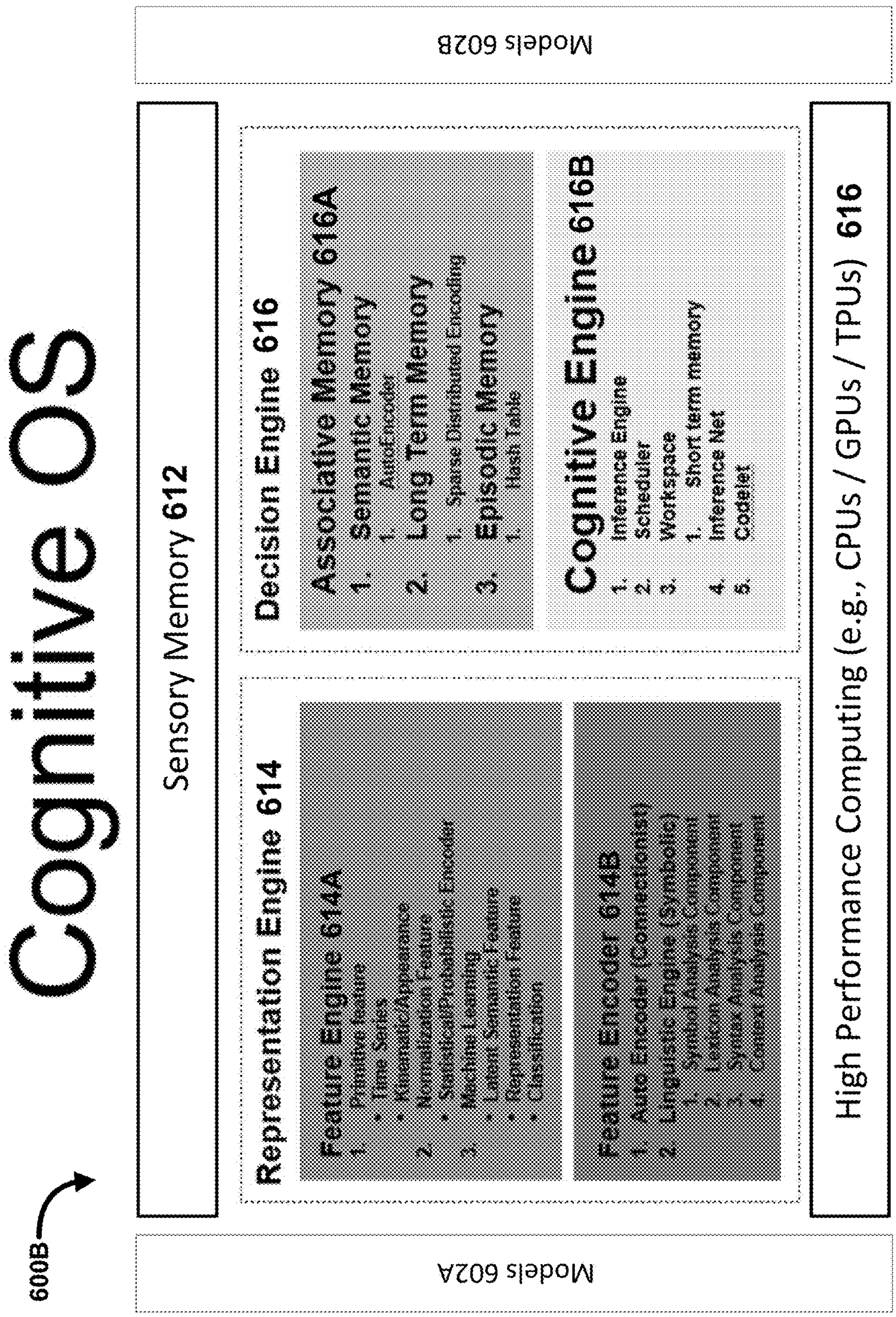
FIG. 6B is a diagram showing an example implementation of the cognitive operating system of FIG. 6A, according to some embodiments.

The cognitive information processing system 600B of FIG. 6B illustrates an implementation of the cognitive information processing system 600A of FIG. 6A, and includes sensory memory 612, models 602A and 602B, a representation engine 614, a decision engine 616 (including an associative memory 616A and a cognitive engine 616B), and a collection of one or more CPUs, GPUs and/or Tensor Processing Units (TPUs) 616 as part of a high performance computing system. The representation engine 614 includes a feature engine 614A and a feature encoder 614B. In one embodiment, the feature engine 614A is configured to generate primitive features such as time series data, kinematics, appearance data, etc. In one embodiment, the feature engine 614A is also configured to normalize the primitive features (e.g., using a statistical or probabilistic encoder). In one embodiment, the feature engine 614A can also include machine learning capabilities, for example to identify latent semantic features, generate representation features, and perform classification on input data. In one embodiment, the feature encoder 614B includes an autoencoder (also referred to herein as "connectionist"). In one embodiment, the feature encoder includes a linguistic engine (also referred to herein as a symbolic encoder). The representation engine includes software components configured for symbolic method and/or connectionist method learning. The decision engine 616 includes an associative memory 616A and a cognitive engine 616B. The associative memory 616A includes one or more of a semantic memory (e.g., including an autoencoder), a long term memory (e.g., including sparse distributed encoding), or an episodic memory (e.g., including a hash table). The cognitive engine 616B includes an inference engine, a scheduler, a workspace (e.g., including short-term memory), an inference network, and one or more codelets.

Figure 6C:
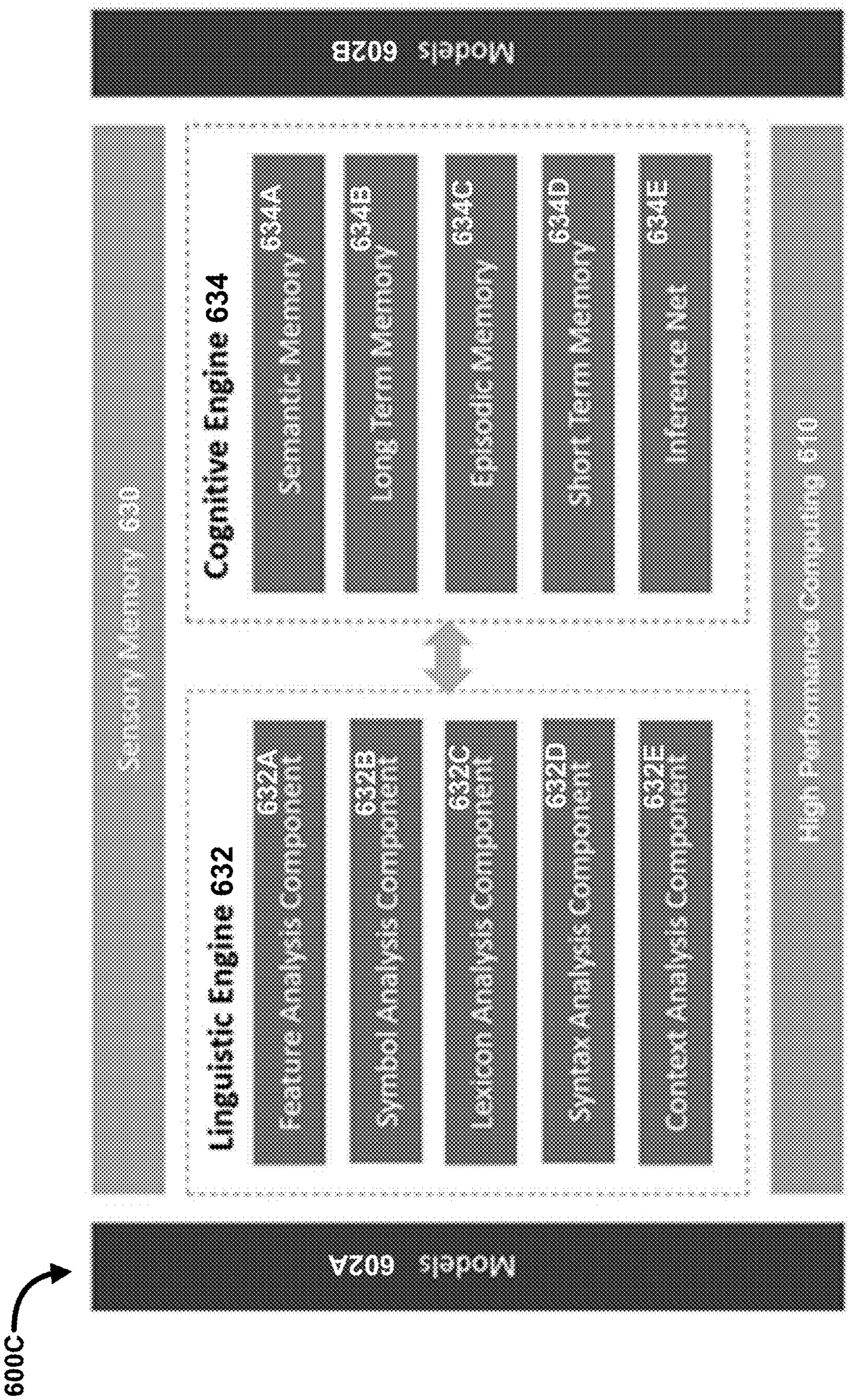
FIG. 6C is a diagram showing an example implementation of the cognitive operating system of FIG. 6B, according to some embodiments.

FIG. 6C is a diagram showing an example implementation of the cognitive operating system of FIG. 6B, according to some embodiments. More specifically, FIG. 6C illustrates symbolic learning with a neuro-linguistic engine and an example cognitive information processing system of the present disclosure, according to some embodiments. The cognitive analytics system 600C of FIG. 6C includes models 602A and 602B, a sensory memory 630, a linguistic engine 632, a cognitive engine 634, and a high performance computing environment 610 (e.g., a wireless or wired network of compute devices), for example similar to the high performance computing environment 560 of FIG. 5. The linguistic engine 632 includes multiple software-implemented components including one or more of: a feature analysis component 632A, a symbol analysis component 632B, a lexicon analysis component 632C, a syntax analysis component 632D, and a context analysis component 632E. The cognitive engine 634 includes one or more of a semantic memory 634A, a long-term memory 634B, an episodic memory 634C, a short term memory 634D, and an inference network 634E.

Figure 6D:
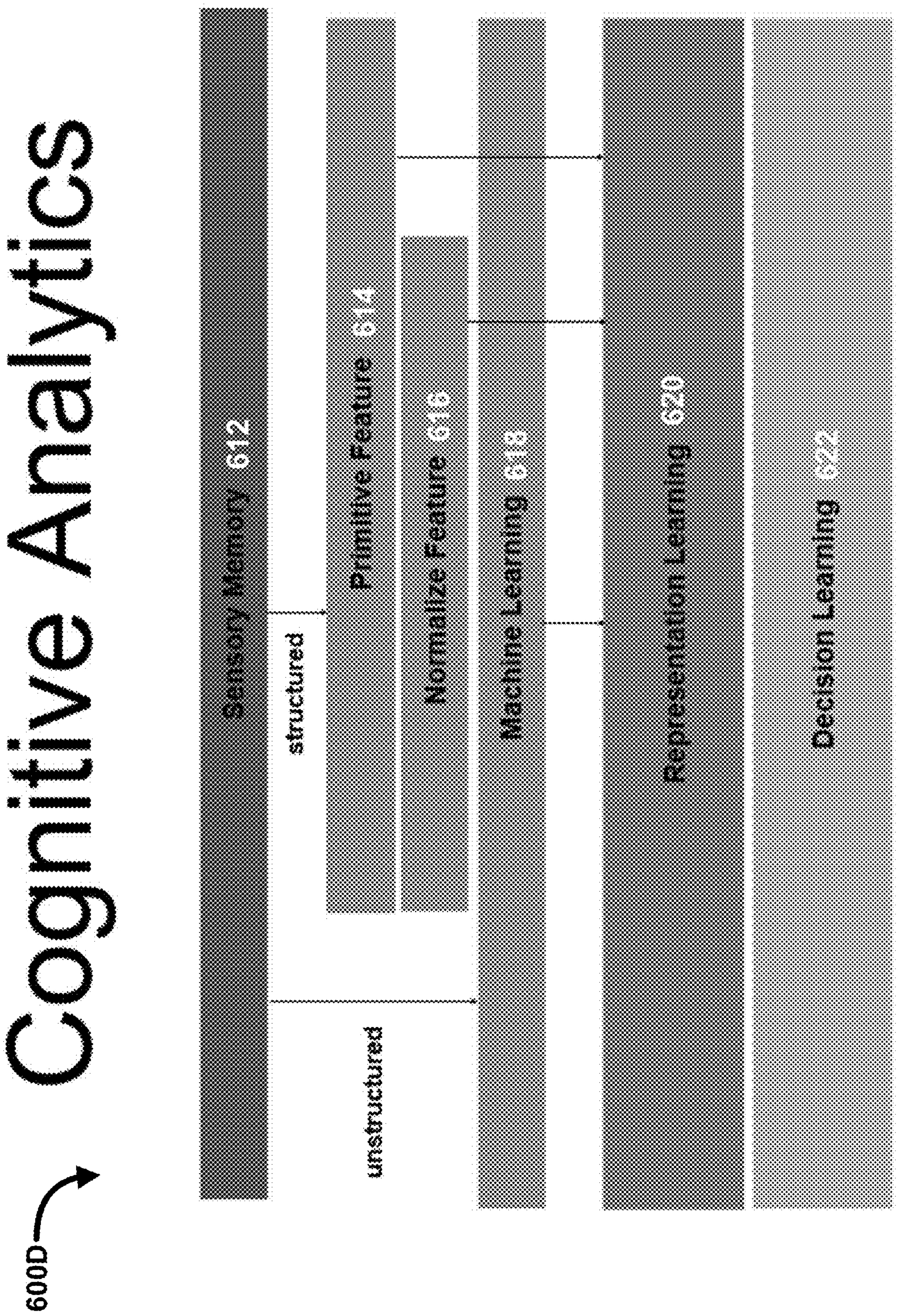
FIG. 6D is a diagram showing example data flows for the cognitive operating system of FIG. 6A, according to some embodiments.

FIG. 6D is a diagram showing example data flows within a cognitive operating system (such as the cognitive operating system 600A of FIG. 6A), according to some embodiments. The cognitive analytics system 600D of FIG. 6C includes a sensory memory 612, primitive features 614, normalized features 616, machine learning software or algorithm(s) 618, representation learning software or algorithm (s) 620, and decision learning software or algorithm(s) 622. The sensory memory 612 can include structured data and unstructured data. As used herein, "structured data" refers to data that is stored in a uniform predefined format, whereas "unstructured data" refers to data that includes a variety of types/formats that that is stored in its native formats. The unstructured data can be provided directly to the machine learning software 618 for use in training, classification and/or the generation of predictions based on the unstructured data. The structured data can be used by the cognitive information processing system 600B to generate primitive features 614 that are, in turn, normalized to generate normalized features 616. The normalized features 616, the primitive features 614 and/or output from the machine learning software 618 can be provided to the representation learning software 620 and/or the decision learning software 622, for example to perform data analysis, generate predictions based on the data, classify data, etc.

Figure 7:
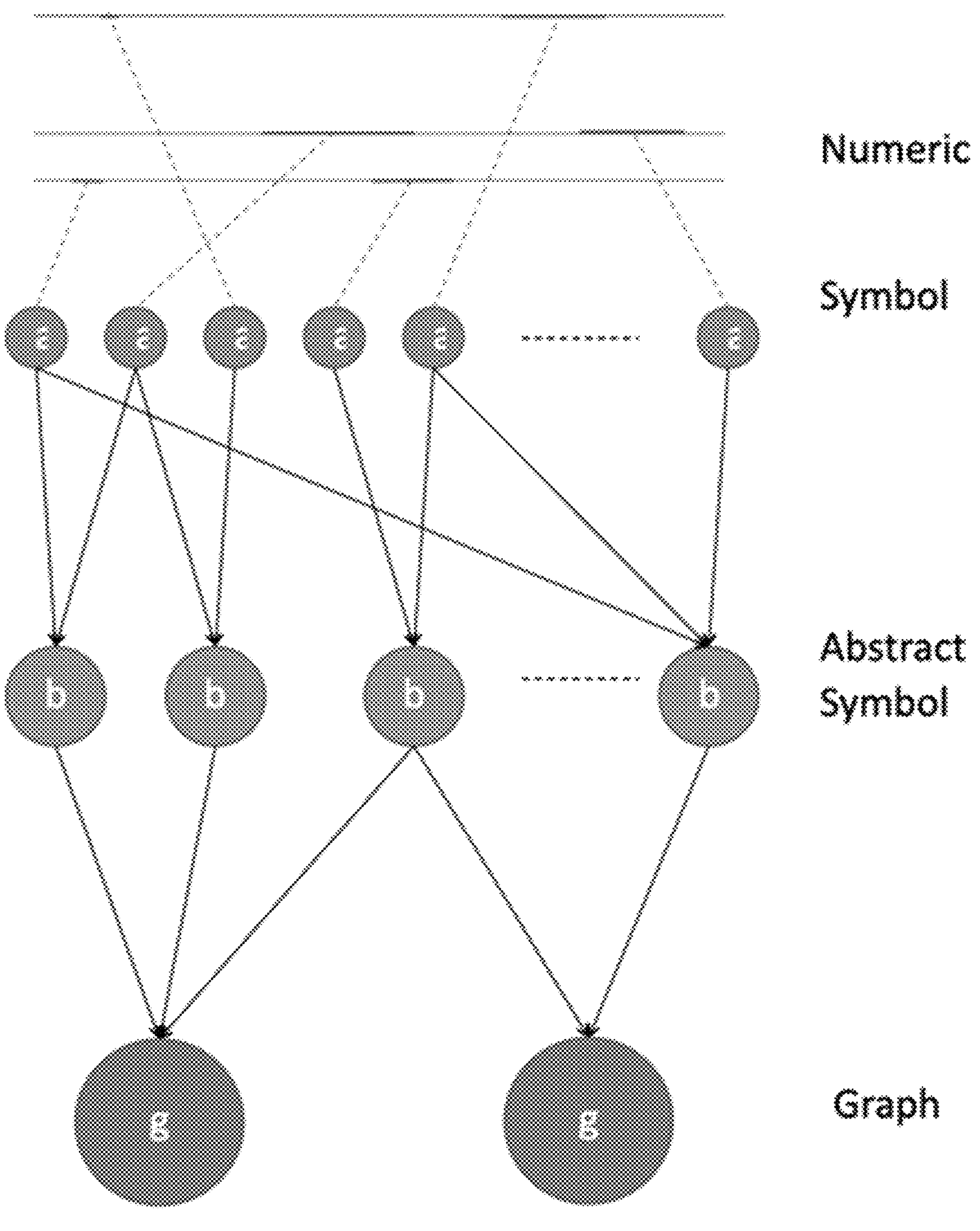
FIG. 7 is a diagram illustrating a linguistic learning procedure, performed by a representation engine or other system (e.g., cognitive information processing system 600A of FIG. 6A), according to an embodiment.

FIG. 7 is a diagram illustrating a linguistic learning procedure, performed by a representation engine or other system (e.g., cognitive information processing system 600A of FIG. 6A), according to an embodiment. FIG. 7 can be understood as a symbolic approach to the implementation of the cognitive operating system 600C of FIG. 6C. As shown in FIG. 7, beginning at the top of the page, numeric input data can be mapped to symbols (e.g., 1-feature symbols), which can subsequently be grouped into abstract symbols (e.g., 2-feature symbols, 3-feature symbols, and/or n-feature symbols), and the abstract symbols can be grouped into distinct graphs. In some implementations, alpha symbols are assigned to, or represent, letters; beta symbols are assigned to, or represent, lexicons; and gamma symbols are assigned to, or represent, syntaxes.

Figure 8:
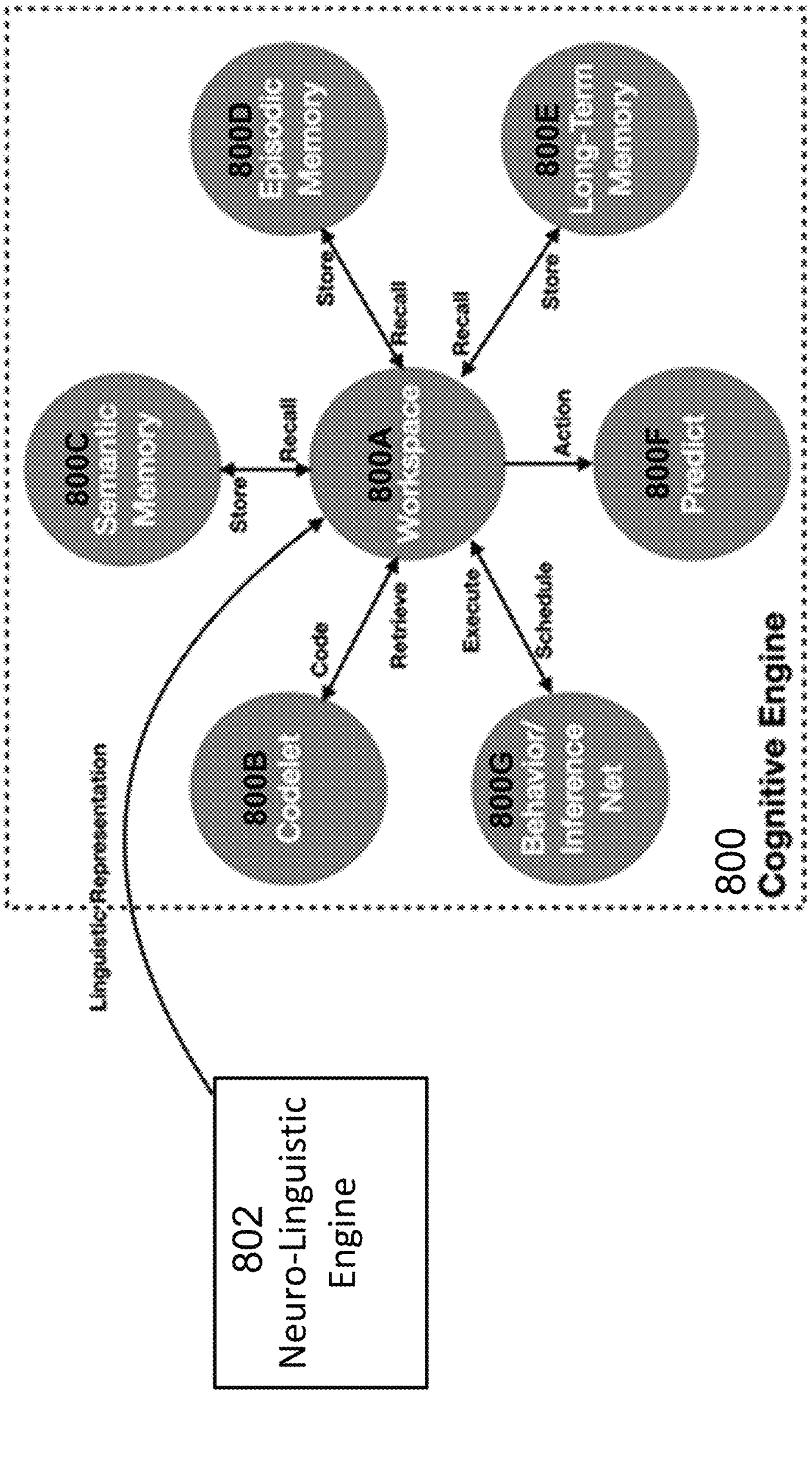
FIG. 8 is a diagram showing a decision learning procedure, performed by a cognitive engine, according to an embodiment.

FIG. 8 is a diagram showing an embodiment of a decision learning procedure, performed by a cognitive engine (e.g., cognitive information processing system 600A of FIG. 6A). As shown in FIG. 8, the cognitive engine 800 includes a workspace 800A that can access (e.g., via wireless and/or wired network communications) one or more codelets in a codelet repository 800B, a semantic memory 800C, an episodic memory 800D, a long-term memory 800E, and a behavior/inference network 800G. The workspace 800A is a location where information can be fetched from memories and where calculations (or conditions) can be performed by the cognitive engine. In connection with the cognitive analysis, code can be generated at the workspace 800A and stored as one or more codelets in the codelet repository 800B. Similarly, one or more codelets can be retrieved from the codelet repository 800B by the workspace 800A (e.g., in response to a user input containing a request for the codelet (s)). The workspace can cause the received linguistic representations to be stored in one or more of the semantic memory 800C, the episodic memory 800D, or the long-term memory 800E, and representations can in turn be retrieved by the workspace 800A from the semantic memory 800C, the episodic memory 800D and/or the long-term memory 800E. One or more schedules can be generated at the workspace 800A and sent to the behavior/inference at 800G for later execution. As a result of the decision learning procedure, one or more predictions 800F can be output (e.g., sent to a remote compute device for display thereon).

Figure 9:
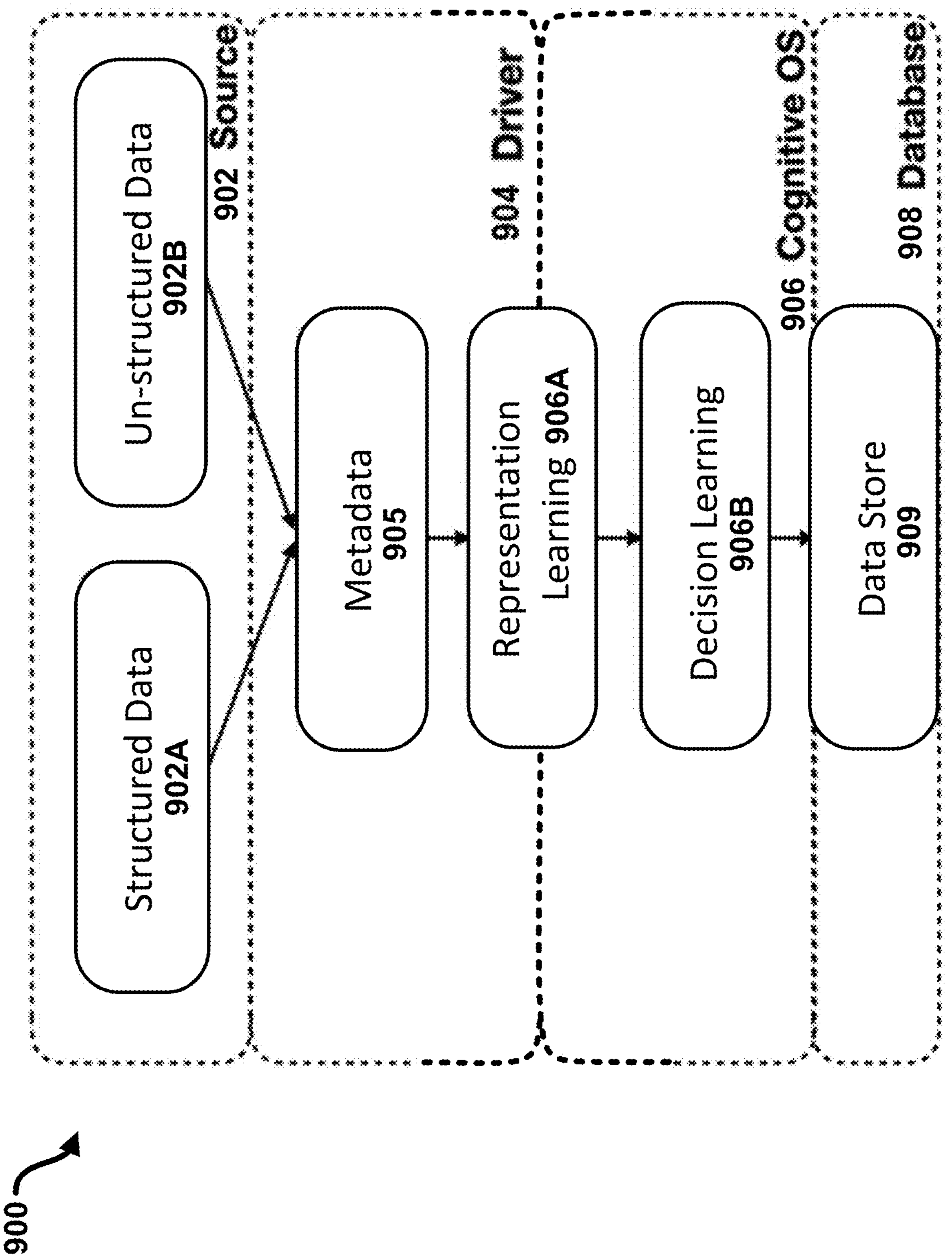
FIG. 9 is a diagram showing a cognitive cycle, according to an embodiment.

FIG. 9 is a diagram showing a cognitive cycle 900, according to an embodiment. During the cognitive cycle, metadata associated with source data 902 (including structured data 902A and/or unstructured data 902B) is generated by a software driver 904 for delivery to a cognitive OS 906. Within the cognitive OS 906, representation learning 906A and decision learning 906B are performed based on the metadata. The results of the representation learning 906A and decision learning 906B are then saved in a data store 909 of a database 908. As shown in FIG. 9, the representation learning 906A can be divided between the driver 904 and the cognitive OS 906, e.g., based on the internet speed and/or device capabilities. In other implementations, component 906A can be performed entirely by the driver 906.

Figure 10:
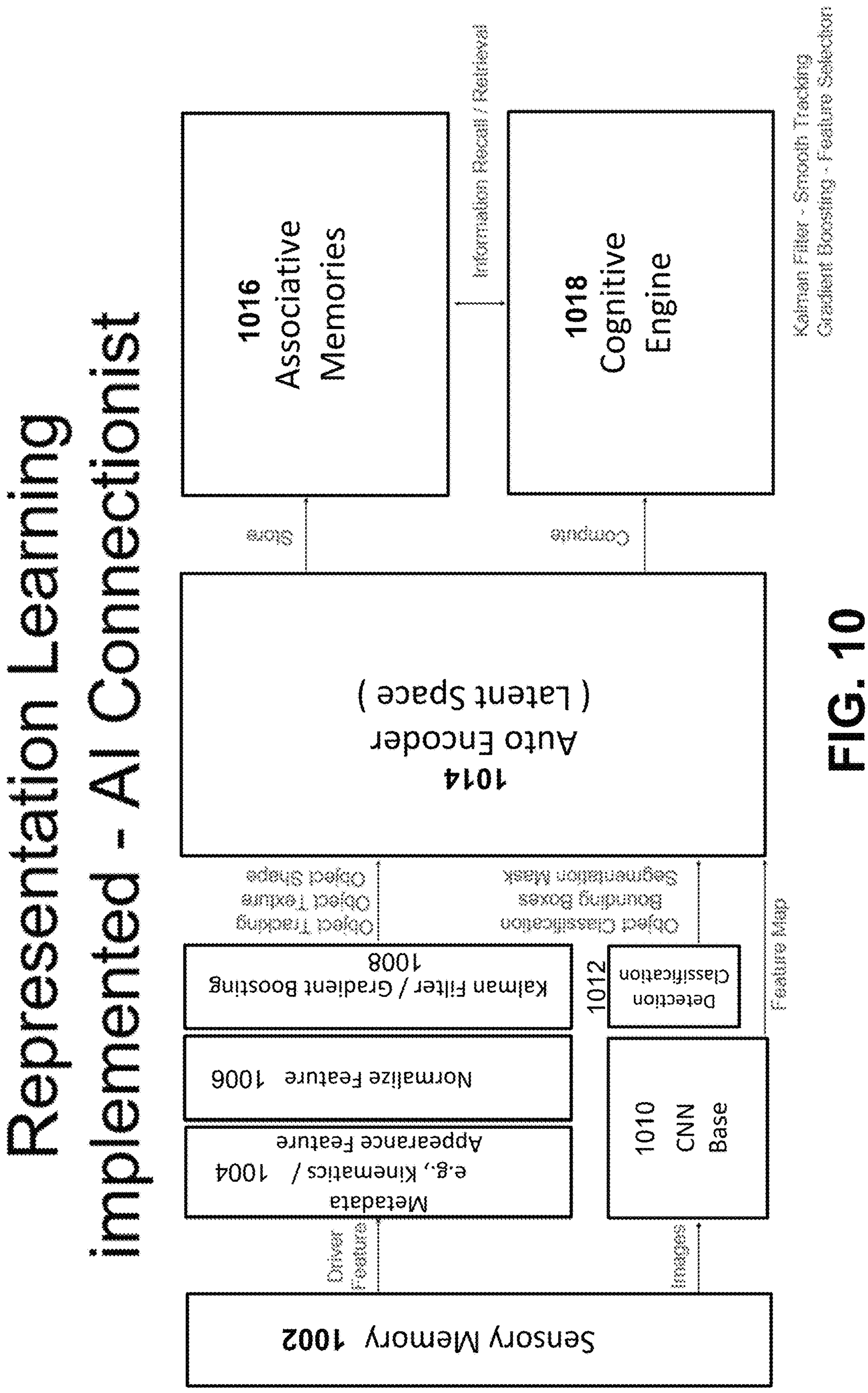
FIG. 10 is a diagram of a system for representation learning utilizing a connectionist approach, including an autoencoder, for cognitive analytics system 600D in FIG. 6D, according to an embodiment.

FIG. 10 is a diagram of a system for representation learning (i.e., representation learning 606 of FIG. 6A), including an autoencoder, according to an embodiment. More specifically, FIG. 10 is a specific implementation of "connectionst" learning (which, itself, is an implementation of representation learning). As shown in FIG. 10, a software driver generates metadata 1004 (e.g., including kinematics, appearance data, etc.) based on data stored in a sensory memory 1002. The feature engine normalizes the features based on the metadata, to generate normalized features 1006. A Kalman filter (for smooth tracking) and/or gradient boosting (for feature selection) 1008 is applied to the normalized features, to produce object tracking data, object texture data and/or object shape data to an autoencoder 1014. Also in FIG. 10, image data is sent from the sensory memory 1002 to a convolutional neural network base model (e.g., a deep neural network, such as Residual Network 50 ("ResNet-50")) 1010 for generation of a feature map. Detection and classification 1012 are also performed on the image data, to produce object classification(s), bounding boxes, and/or segmentation masks. The object tracking data, object texture data, object shape data, feature map, object classification(s), bounding boxes, and/or segmentation masks are provided to an autoencoder 1014 for compression into a latent space for later reconstruction. The compressed data can be stored in one or more associative memories 1016 that are accessible to a cognitive engine 1018. The cognitive engine 1018 can retrieve the compressed data from the one or more associative memories 1016 and/or the cognitive engine 1018 can receive the compressed data directly from the autoencoder 1014.

Figure 11:
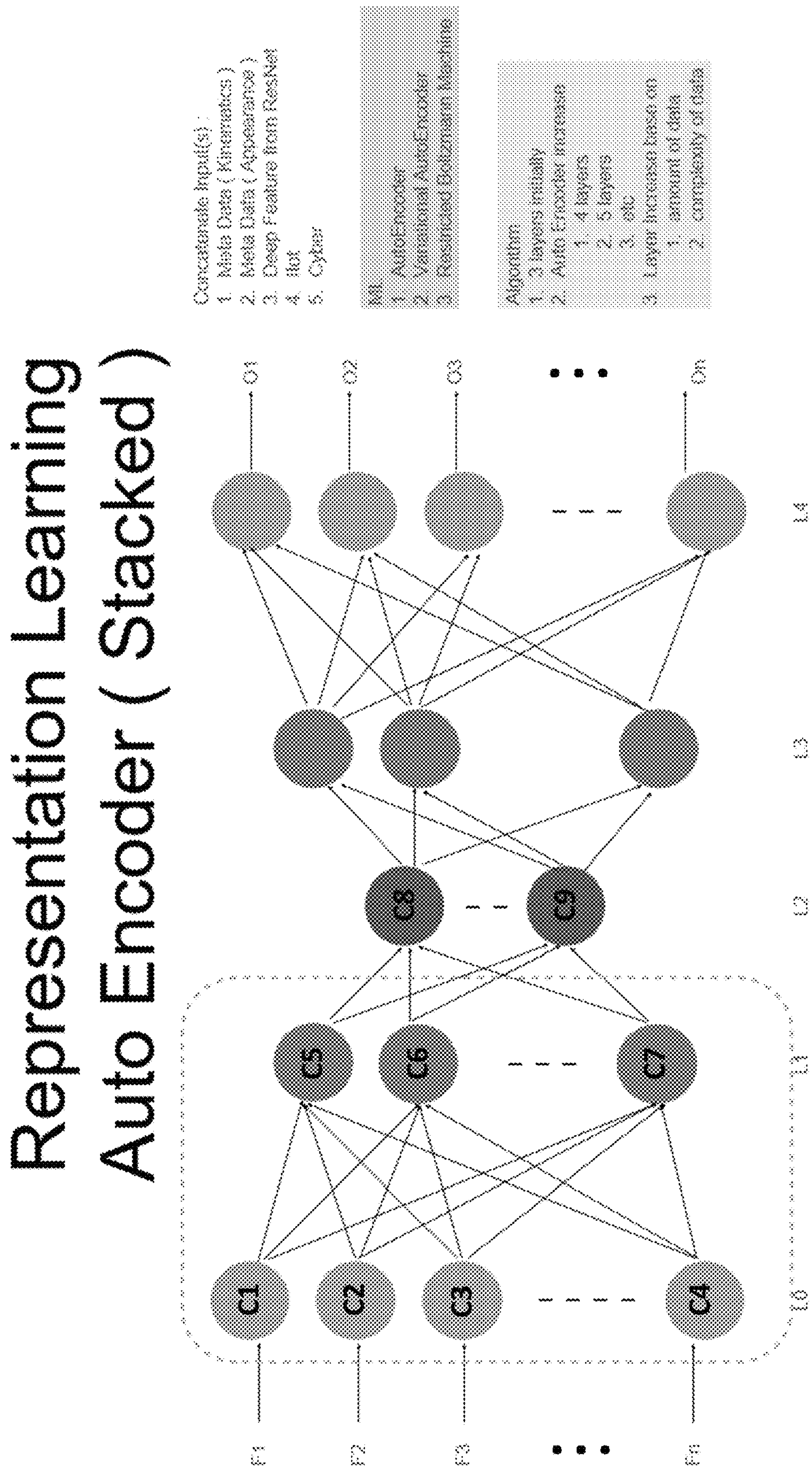
FIG. 11 is a diagram showing a representation learning procedure performed utilizing a connectionist approach (e.g., using the autoencoder 1014 of FIG. 10), according to an embodiment.

FIG. 11 is a diagram showing a representation learning procedure utilizing a connectionist approach and performed by an autoencoder (e.g., autoencoder 1014 of FIG. 10), and including auto stacking layer by layer, according to an embodiment. An autoencoder is a type of artificial neural network used to learn efficient data codings in an unsupervised manner. Autoencoders learn representations (encoding) for a set of data, typically for dimensionality reduction, by training the network to ignore signal "noise." In addition to a dimensionality reduction side, a reconstructing side is learned, where the autoencoder tries to generate, from the reduced encoding, a representation as close as possible to its original input. As shown in FIG. 11, input data is received at input layer L0 via nodes (or neurons) C1, C2, C3, and C4. The input data can include one or more metadata such as kinematic data or appearance data, deep neural network features (e.g., from residual neural network ("ResNet")), industrial internet of things (IIoT) data, and/or cyber data. In hidden layer L1, input data is encoded in nodes (or neurons) C5, C6, C7. In some embodiments, in hidden layer L2, L1 is encoded in nodes (or neurons) C8 and C9. As shown in FIG. 11, each of the layers L0, L1 and L2 can utilize one or more nodes (i.e., neurons). The encoding can be performed using one or more of: an autoencoder, a variational encoder, or a restricted Boltman machine. Although shown and described with reference to FIG. 11 as including three layers prior to reconstruction, in other embodiments, additional layers may be used, for example with increased amounts of input data and/or with increased data complexity.

Figure 12:
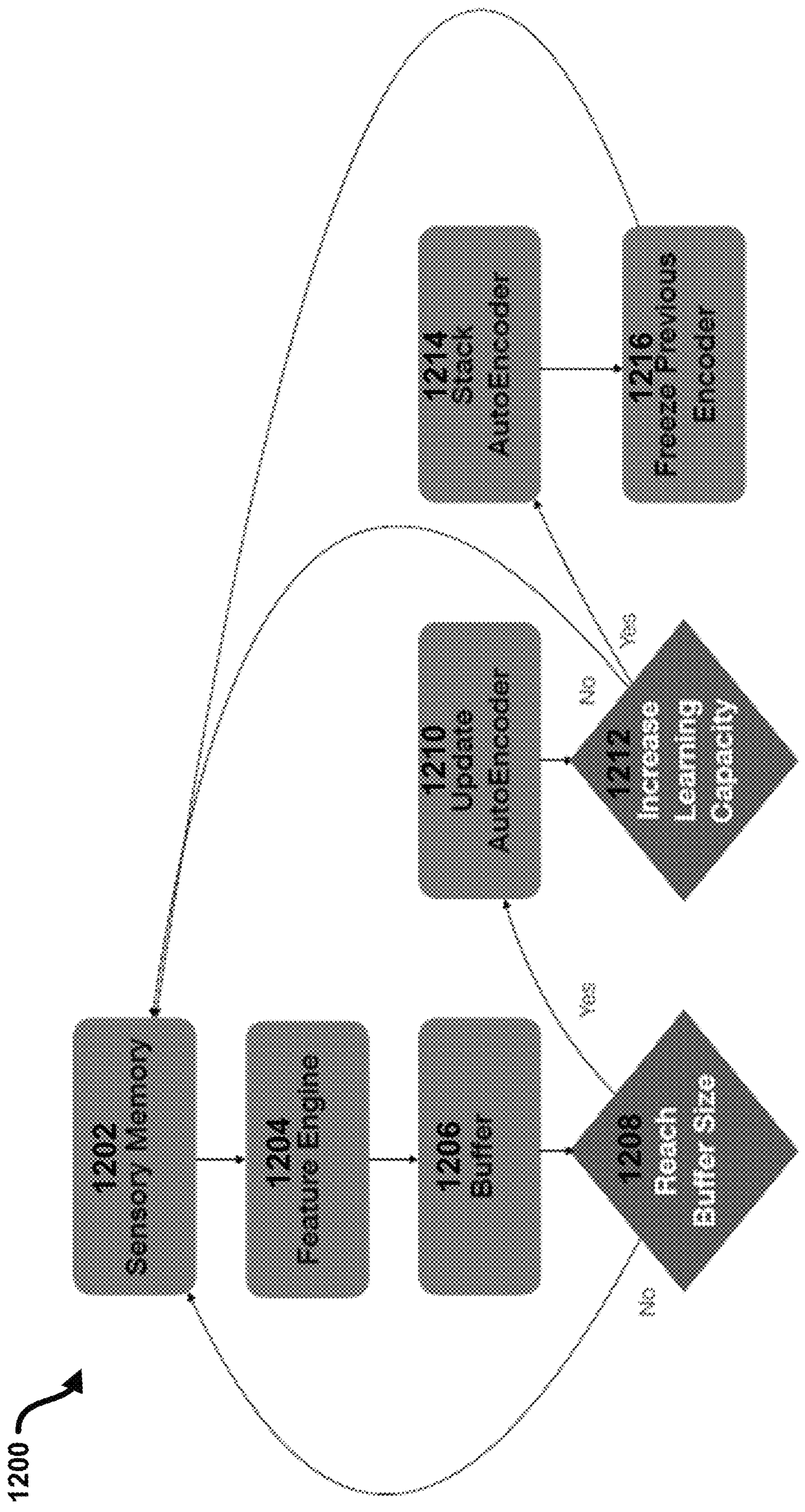
FIG. 12 is a flow diagram showing an online model update method that can be performed in conjunction with the representation learning of FIG. 11, according to an embodiment.

FIG. 12 is a flow diagram showing an online model update method 1200 (e.g., showing the addition of neuron layers during a representation learning procedure such as that of FIG. 11), according to an embodiment. As shown in FIG. 12, the online model update method 1200 includes sending data from a sensory memory 1202 to a feature engine 1204 that generates features based on the input data, and sends the features to a buffer 1206. At 1208, a determination is made as to whether a maximum buffer size has been reached. If not (i.e., the buffer is not yet full), the method 1200 loops back to sending additional input data from the sensory memory 1202 to the feature engine 1204. If, at 1208, it is determined that the maximum buffer size has been reached, an autoencoder update 1210 is performed. At 1212, a determination is made as to whether a learning capacity has been increased. If not, the method 1200 loops back to sending additional input data from the sensory memory 1202 to the feature engine 1204. If, at 1212, it is determined that the learning capacity has been increased, the updated autoencoder is stacked with one or more other autoencoders, at 1214. At 1216, a previous encoder is frozen/stopped, and the method 1200 loops back to sending additional input data from the sensory memory 1202 to the feature engine 1204.

Figure 13A:
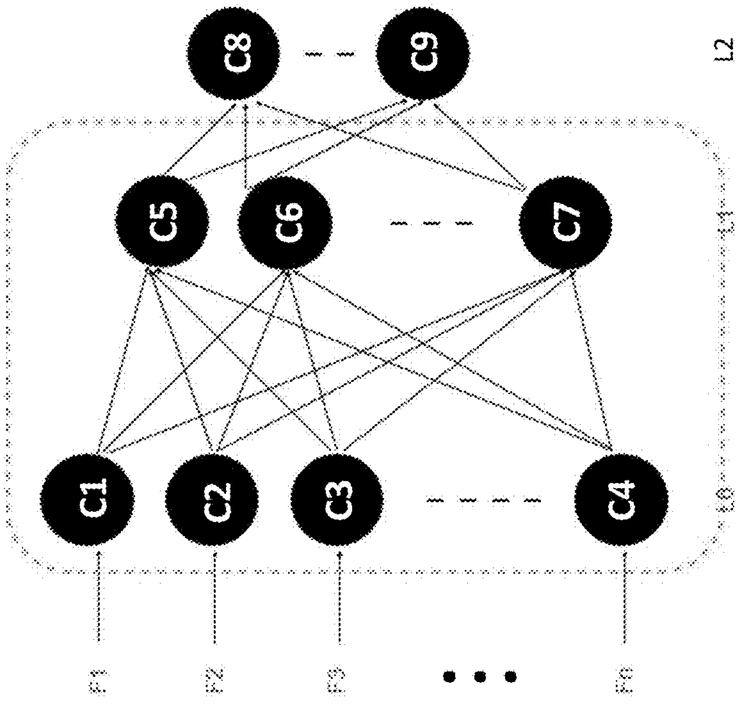
FIGS. 13A-13B illustrate a representation learning task performed by an autoencoder (e.g., autoencoder 1014 of FIG. 10), according to an embodiment.
Figure 13B:
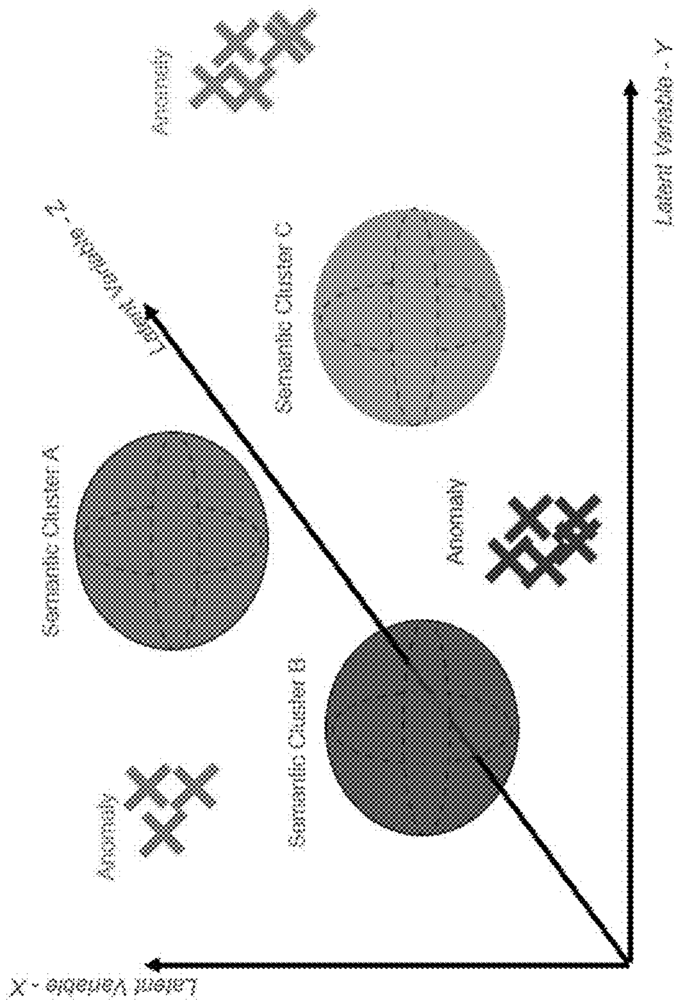

FIGS. 13A-13B illustrate a representation learning task performed by an autoencoder (e.g., autoencoder 1014 of FIG. 10), according to an embodiment. Similar to the representation learning shown in FIG. 11, FIG. 13A shows input data (e.g., unlabeled sensor data F1, F2, F3 . . . Fn) received at input layer 0 ("L0"), including nodes (or "neurons") C1 through C4. Nodes (or neurons) C5 though C7 are a first hidden layer, and nodes (or neurons) C8-C9 are a second hidden layer that produces an encoding. FIG. 13B shows the positioning of semantic clusters A, B and C (representing clusters based on nodes C5-C7) on a latent variable map. Anomalies also appear in the latent variable map, and fall outside the semantic clusters.

Figure 14:
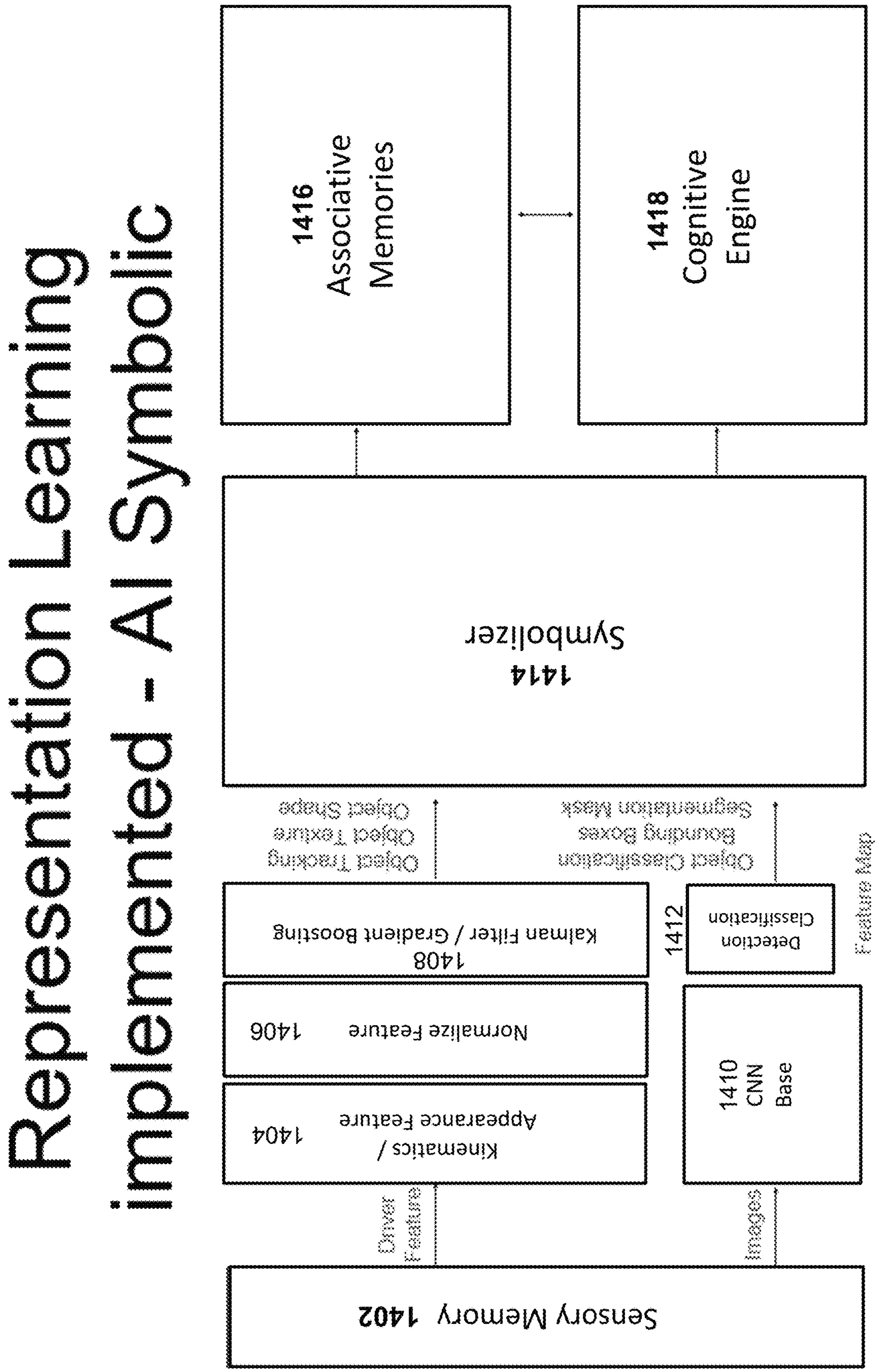
FIG. 14 is a diagram showing a specific implementation of symbolic learning (which, itself, is an implementation of representation learning) for cognitive operating system 600B in FIG. 6B, according to an embodiment.

FIG. 14 is a diagram showing a specific implementation of symbolic learning (which, itself, is an implementation of representation learning 606 of FIG. 6A), for cognitive operating system 600B in FIG. 6B, according to an embodiment. As shown in FIG. 14, feature data is sent, using a software driver, from a sensory memory 1402 to a feature engine for identification of associated metadata 1404 (e.g., including kinematics, appearance data, etc.). The feature engine normalizes the features based on the metadata, to generate normalized features 1306. A Kalman filter (for smooth tracking) and/or gradient boosting (for feature selection) 1408 is applied to the normalized features, to produce object tracking data, object texture data and/or object shape data that is sent to a symbolizer 1414 (e.g., a neuro-linguistic model (for symbolic approaches to representation learning), and autoencoder, and/or a neural network (e.g., for a connectionist approach to representation learning). Also in FIG. 14, image data is sent from the sensory memory 1402 to a convolutional neural network base model (e.g., ResNet-50) 1410 for generation of a feature map. Detection and classification 1412 are also performed on the image data, to produce object classification(s), bounding boxes, and/or segmentation masks. The object tracking data, object texture data, object shape data, feature map, object classification(s), bounding boxes, and/or segmentation masks are provided to the symbolizer 1414 for encoding. The encoded data can be stored in one or more associative memories 1416 that are accessible to a cognitive engine 1418. The cognitive engine 1418 can retrieve the encoded data from the one or more associative memories 1416 and/or the cognitive engine 1418 can receive the encoded data directly from the symbolizer 1414.

Figure 15:
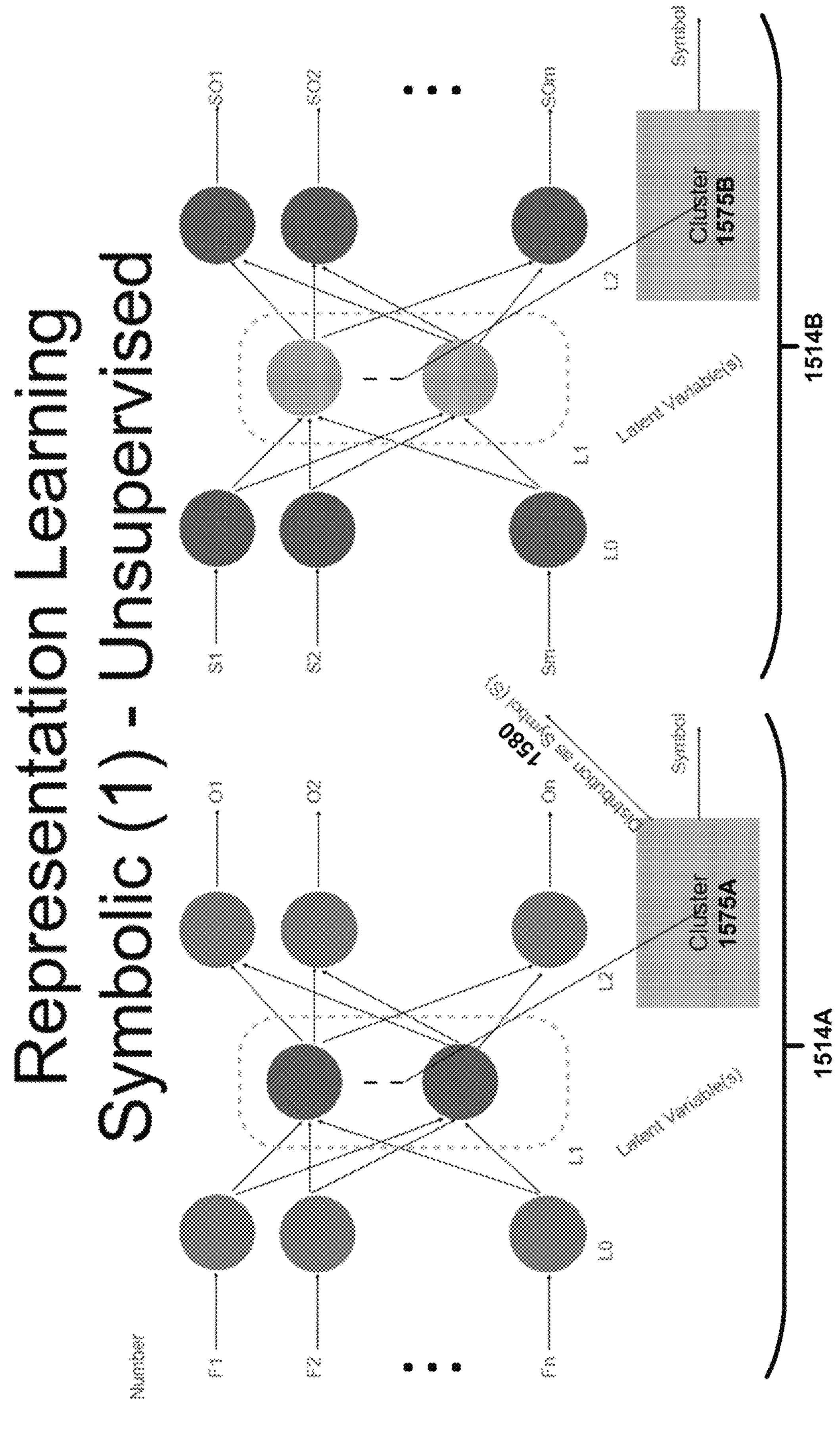
FIG. 15 illustrates an unsupervised representation learning method (e.g., using the symbolizer 1414 of FIG. 14), according to an embodiment.

FIG. 15 illustrates an unsupervised representation learning procedure (performed, for example, by symbolizer 1414 in FIG. 14), according to an embodiment. The input data F1, F2 . . . Fn can include one or more metadata such as kinematic data or appearance data, deep neural network features (e.g., from residual neural network ("ResNet")), industrial internet of things (IIoT) data, and/or cyber data. The latent variable(s) at hidden layer L1 are encoded by associating the output layers O1, O2 . . . On to the input layer L0 from input data F1, F2 . . . Fn via a plurality of neurons or nodes. One or more latent variable(s) are symbolized by one or more cluster(s) based on a probability distribution. One or more of the latent symbols may be distributed for use as input data to a next L0 at S1, S2 . . . Sm. The latent variable(s) are encoded by associating the output layer nodes SO1, SO2 . . . SOn to the input layer L0 nodes from S1, S2 . . . Sn. In some embodiments, one or more autoencoders and/or variational encoders are utilized to encode one or more latent representations of the data, depending on the complexity of the data. For example, 1514A in FIG. 15 can refer to a first autoencoder that outputs one or more clusters 1575A, and 1514B in FIG. 15 can refer to a second autoencoder that outputs one or more clusters 1575B.

Figure 16:
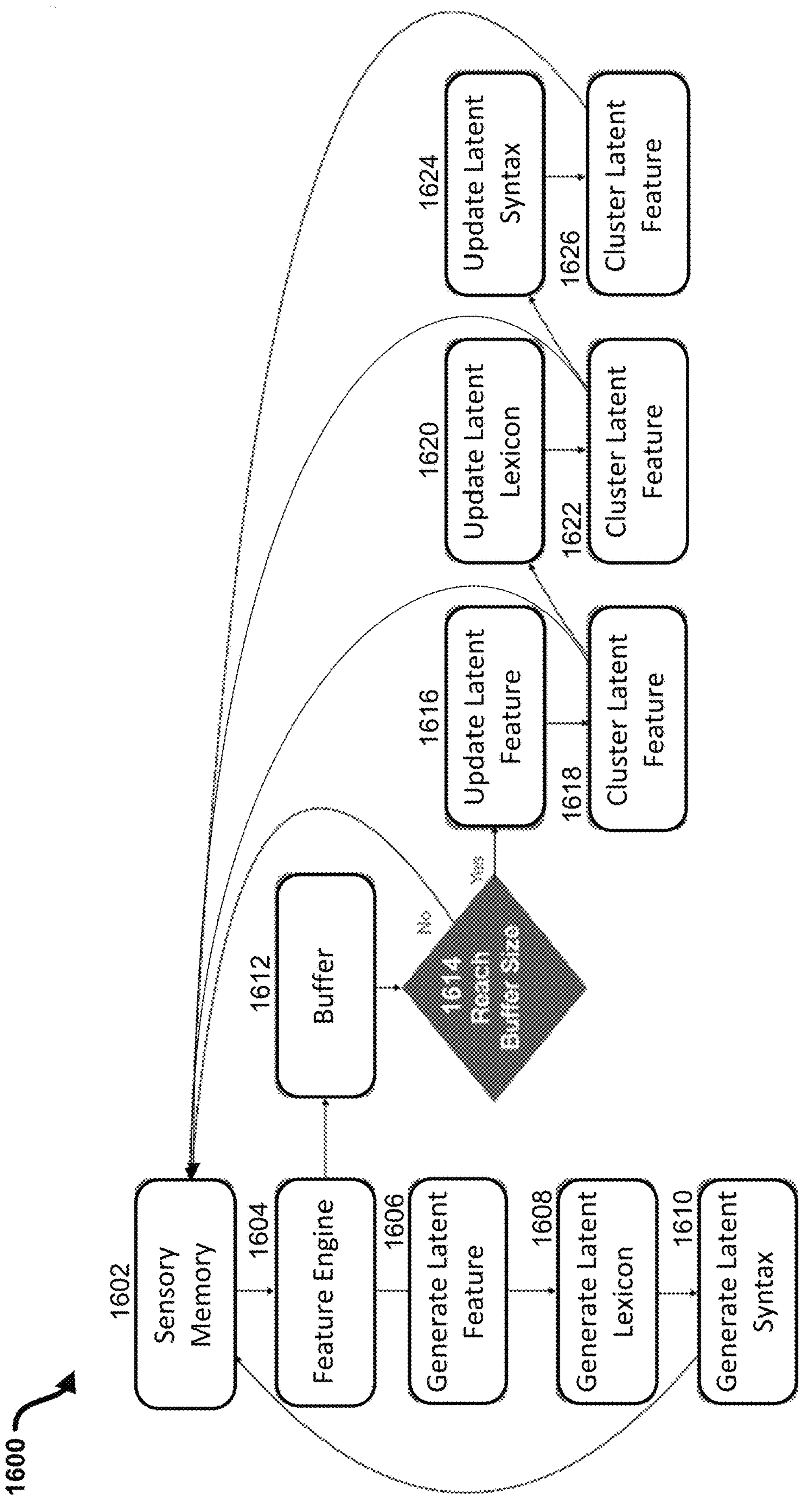
FIG. 16 is a flow diagram showing an online model update method using the unsupervised representation learning procedure of FIG. 15, according to an embodiment.

FIG. 16 is a flow diagram showing an online update method using the unsupervised representation learning procedure of FIG. 15, according to an embodiment. As shown in FIG. 16, the online model update method 1600 includes sending data from a sensory memory 1602 to a feature engine 1604 that generates features based on the input data, and sends the features to a buffer 1612. Latent features are also generated, at 1606, based on the features, at 1608 a latent lexicon is generated based on the latent features, and at 1610 a latent syntax is generated based on the latent lexicon. At 1614, a determination is made as to whether a maximum buffer size has been reached. If not (i.e., the buffer is not yet full), the method 1600 loops back to sending additional input data from the sensory memory 1602 to the feature engine 1604. If, at 1614, it is determined that the maximum buffer size has been reached, one or more latent features are updated at 1616 (e.g., using an autoencoder, such as the first autoencoder 1514A of FIG. 15), and the updated latent features are clustered at 1618 to form first latent feature clusters (e.g., similar to the one or more clusters 1575A of FIG. 15). The latent lexicon is updated at 1620 (e.g., using an autoencoder, such as the second autoencoder 1514B of FIG. 15) based on the latent feature clusters (e.g., distributed at 1580 in FIG. 15 as symbols), and the latent features are again clustered 1622 into second latent feature clusters. The latent syntax is updated at 1624 based on the second latent feature clusters, and the latent features are again clustered at 1626. Each of clustering steps 1618, 1622 and 1626 can loop back to sending additional input data from the sensory memory 1602 to the feature engine 1604.

Figure 17:
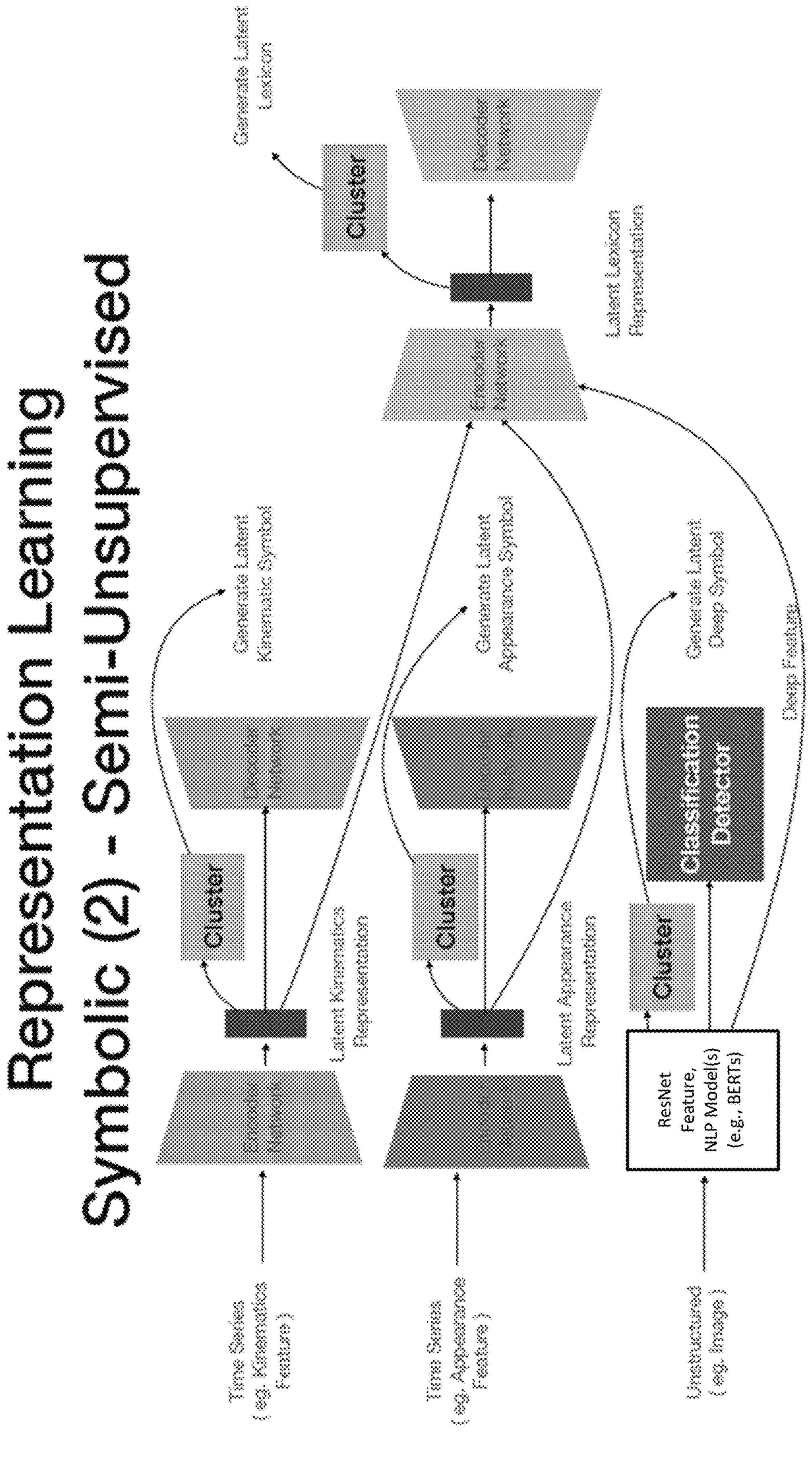
FIG. 17 illustrates a semi-supervised representation learning procedure (e.g., using the symbolizer 1414 of FIG. 14), according to an embodiment.

FIG. 17 illustrates a semi-supervised representation learning procedure (performed, for example, by symbolizer 1414 in FIG. 14), according to an embodiment. As shown in the top row of FIG. 17, time series input data including kinematics features is provided to a first encoder network (i.e., a network of the autoencoders described herein), which generates latent kinematics representations and clusters the latent kinematics representations into clusters. The latent kinematics representations are sent to a decoder network for reconstruction of the time series input data (e.g., to obtain the latent variable(s)/representation(s)), and the clusters are used in the generation of latent kinematic symbols. Similarly, in the middle row, time series input data including appearance features is provided to a second encoder network, which generates latent appearance representations and clusters the latent appearance representations into clusters. The latent appearance representations are sent to a decoder network for reconstruction of the time series input data, and the clusters are used in the generation of latent appearance symbols. In the bottom row of FIG. 17, unstructured (e.g., image) input data is provided to a ResNet convolutional neural network, which clusters the unstructured input data into clusters and sends the unstructured input data to a classification detector for classification. The clusters are used in the generation of latent deep symbols, while deep features of the unstructured input, together with the latent kinematics representations and the latent appearance representations are sent to an encoder network, which in turn generates associated latent lexicon representations. The encoder network also clusters the latent kinematics representations into clusters that are used in the generation of a latent lexicon. The latent lexicon representations are sent to a decoder network for reconstruction of the overall input data (i.e., including both sets of time series data and the unstructured data).

Figure 18:
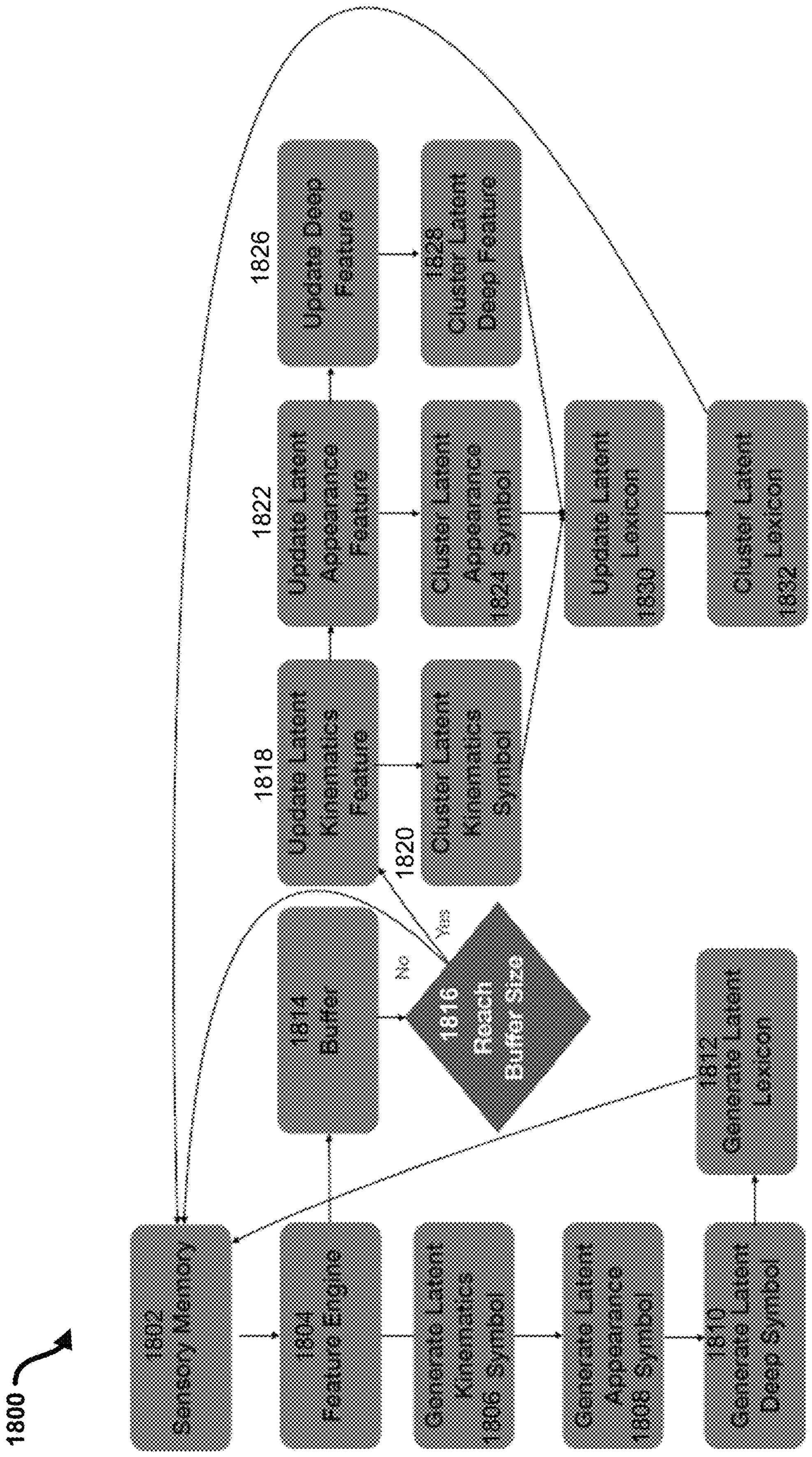
FIG. 18 is a flow diagram showing an online model update method using the semi-supervised representation learning procedure of FIG. 17, according to an embodiment.

FIG. 18 is a flow diagram showing an online model update method 1800 for the representation learning shown in FIG. 17 (performed, for example, by symbolizer 1414 in FIG. 14 and/or using the semi-supervised representation learning procedure of FIG. 17), according to an embodiment. As shown in FIG. 18, the online model update method 1800 includes sending data from a sensory memory 1802 to a feature engine 1804 that generates features based on the input data, and sends the features to a buffer 1814. Latent kinematics symbols are also generated, at 1806, based on the features, at 1808 latent appearance symbols are generated based on the latent kinematics symbols, and at 1810 latent deep symbols are generated based on the latent appearance symbols. A latent lexicon is then generated, at 1812, based on the latent deep symbols, and the online update method 1800 loops back to sending additional input data from the sensory memory 1802 to the feature engine 1804. At 1816, a determination is made as to whether a maximum buffer size has been reached. If not (i.e., the buffer 1814 is not yet full), the method 1800 loops back to sending additional input data from the sensory memory 1802 to the feature engine 1804. If, at 1816, it is determined that the maximum buffer size has been reached, one or more latent kinematics features are updated at 1818, and the updated latent kinematics symbols are clustered at 1820. Also in response to determining at 1816 that the maximum buffer size has been reached, one or more latent appearance features are updated at 1822 (e.g., based on the updated latent kinematics features), and the updated latent appearance symbols are clustered at 1824. Also in response to determining at 1816 that the maximum buffer size has been reached, one or more deep features are updated at 1826 (e.g., based on the updated latent appearance features), and the updated deep features are clustered at 1828. The latent lexicon is updated at 1830 based on the clustered latent kinematics symbols, the clustered latent appearance symbols, and the clustered latent deep features, and the latent lexicon is clustered is clustered at 1832 before looping back to sending additional input data from the sensory memory 1802 to the feature engine 1804.

Figure 19:
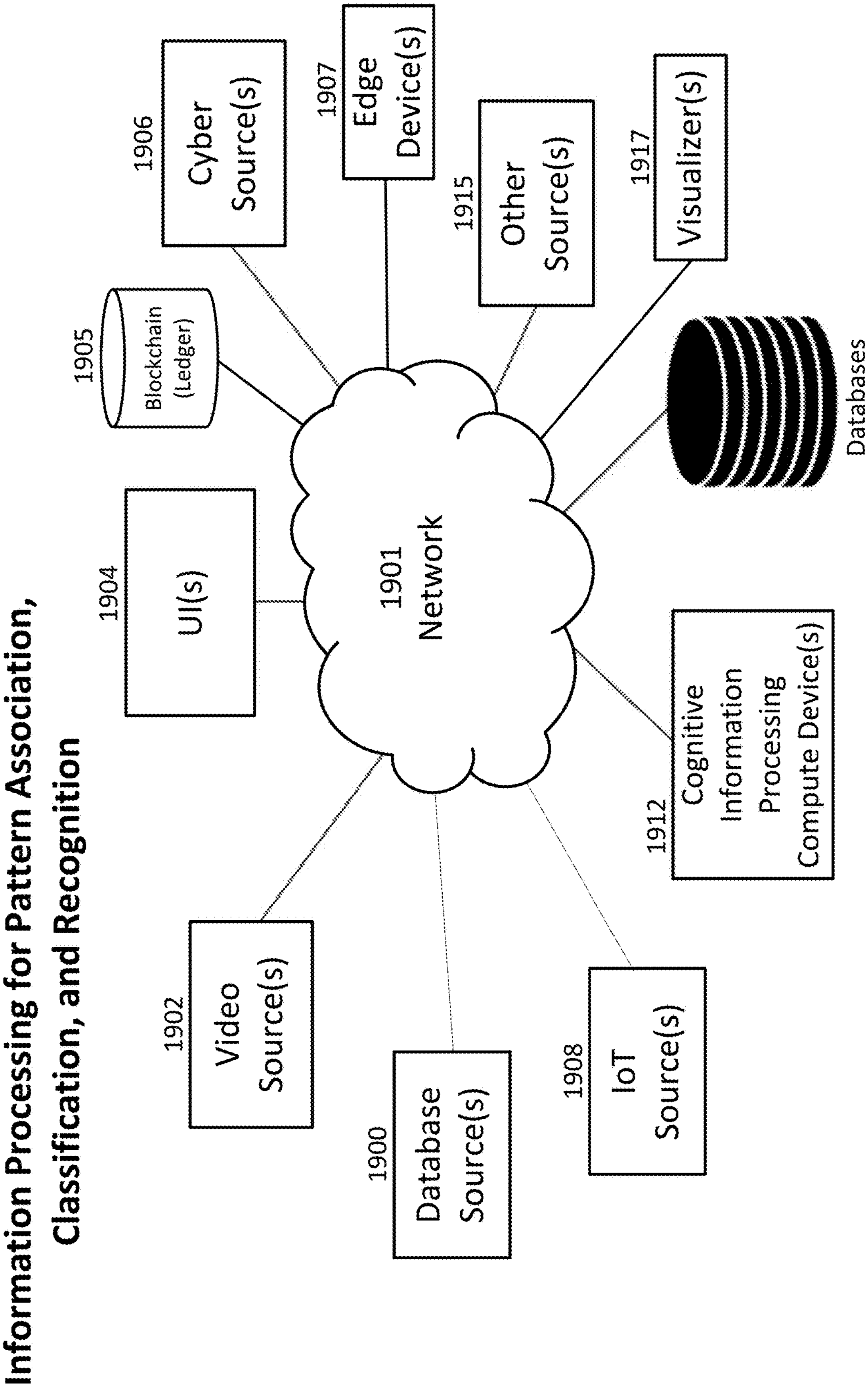
FIG. 19 is a diagram of a networked system for pattern association, classification, and recognition associated with a cognitive information processing system, according to an embodiment.

FIG. 19 is a diagram of a networked system for cognitive information processing for pattern association, classification, and recognition, and cognitive information retrieval associated with a cognitive information processing system, according to an embodiment. As shown in FIG. 19, the networked system includes a wireless or wired network 1901 facilitating data exchange between/among one or more video sources 1902, one or more user interfaces (UIs) 1904, a blockchain (ledger) exchange 1905, one or more cyber sources 1906, one or more edge devices 1907, one or more internet of things ("IoT") sources 1908, one or more database sources 1900, one or more cognitive information processing compute devices 1912, one or more databases 1914, and/or one or more other sources 1915 (e.g., text sources), and one or more visualizers 1917.

Figure 20:
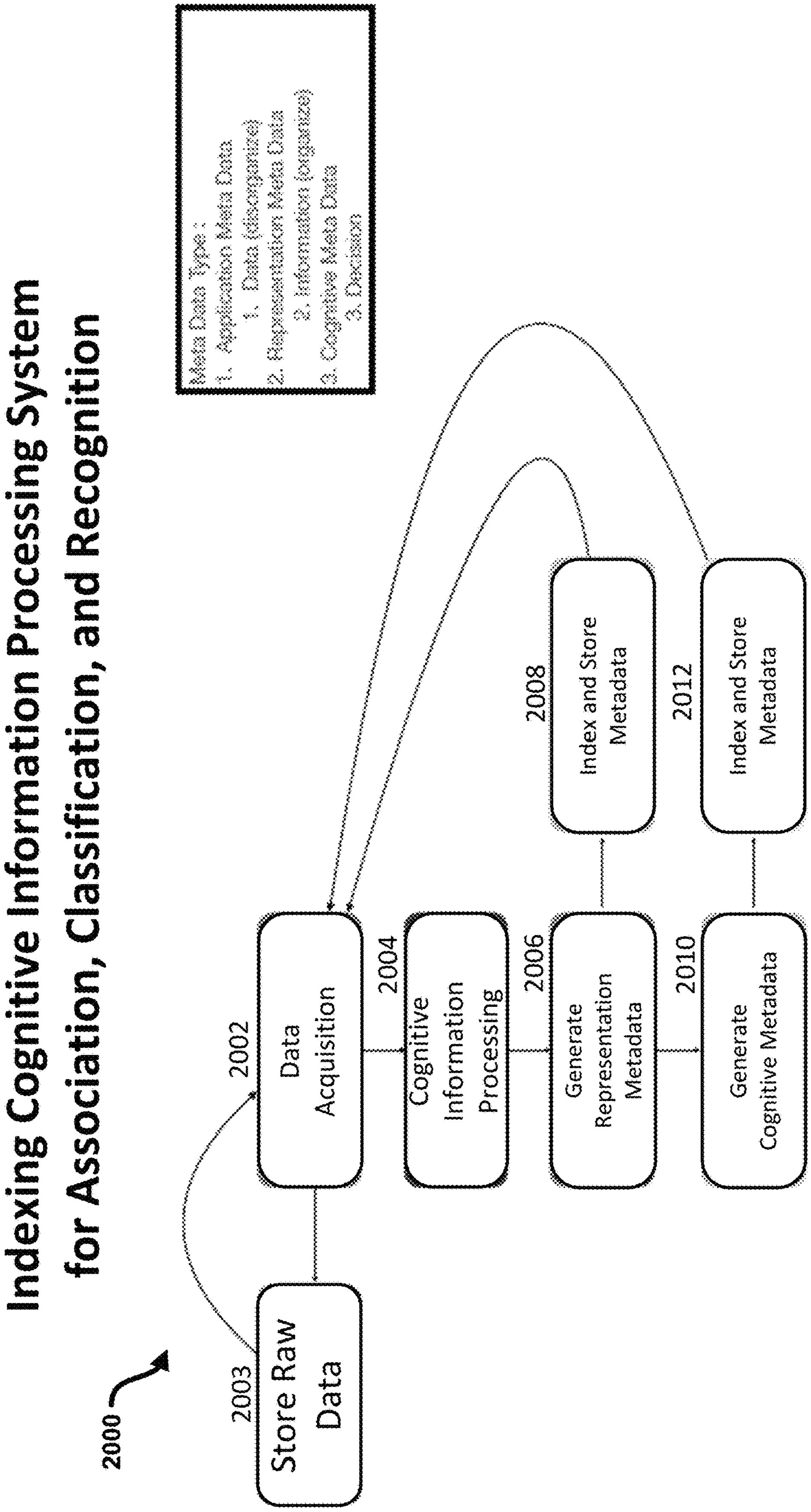
FIG. 20 is a diagram of a method performed by an indexing cognitive information processing system for pattern association, classification, and recognition, according to an embodiment.

FIG. 20 is a diagram of a method 2000 performed by an indexing cognitive information processing system for pattern association, classification, and recognition, according to an embodiment. As shown in FIG. 20, the method 2000 includes an acquisition of raw data at 2002, and storing the raw data at 2003 for subsequent retrieval by the indexing cognitive information processing system. At 2004, cognitive information processing is performed on the raw data to generate, at 2006, representation metadata (e.g., including organized information) associated with the raw data, and to generate, at 2010, cognitive metadata (e.g., including decision data) associated with the raw data. The representation metadata is indexed and stored at 2008 for subsequent use by the indexing cognitive information processing system (see loop back to the data acquisition step at 2002). Similarly, the cognitive metadata is indexed and stored at 2012 for subsequent use by the indexing cognitive information processing system (see loop back to the data acquisition step at 2002). The raw data stored at 2003, the representation metadata stored at 2008, and the cognitive metadata stored at 2012 may be stored in a common memory/repository, or in different associated memories/repositories. In some embodiments, metadata from 2006 and 2010, indexed at 2008 and 2012, respectively (e.g., by cognitive information processing system 2004) can be utilized for data analytics.

Figure 21:
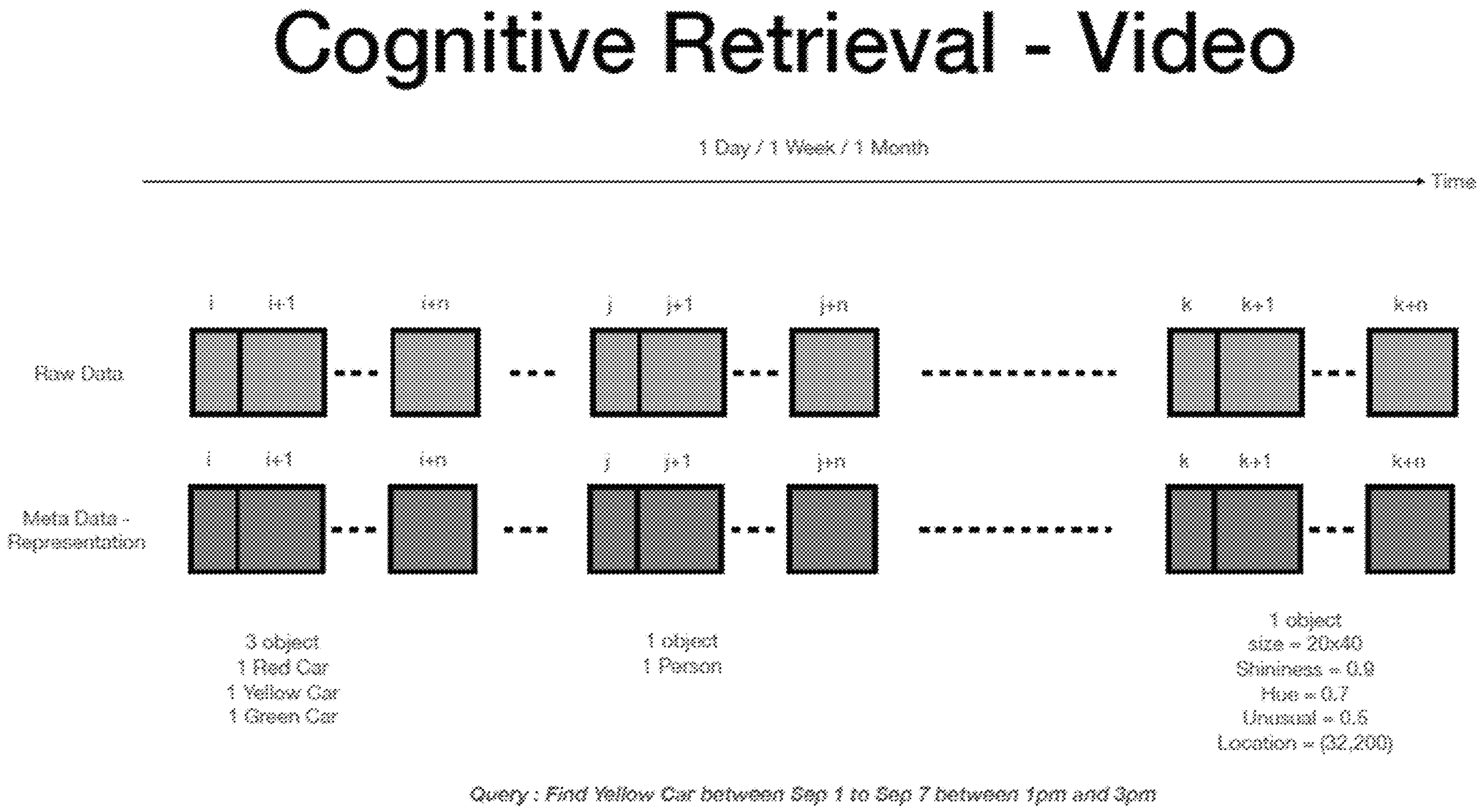
FIG. 21 illustrates a cognitive retrieval process for video data, according to an embodiment.

FIG. 21 illustrates a cognitive retrieval process for video data, according to an embodiment. In the example of FIG. 21, a query is being processed on the video data indexed by the cognitive information processing system, the query requesting identification of a yellow car between September 1 and September 7, and between 1 pm and 3 pm. The top row shows a temporal spread of example raw video data, and the bottom row shows a temporal spread of example metadata associated with the example raw video data. As shown in FIG. 21, the metadata can include information such as a number of objects in the video (e.g., for a given time period or for a given frame or series of frames), whether a car is detected, whether a person is detected, an object color, object size, object shininess, object hue, object location, and unusualness score. In some embodiments, metadata from a cognitive information processing system is utilized to reduce an amount of video footage based on relevant information such as video summarization data. In some embodiments, metadata obtained via representation learning is used to search for one or more appearances, one or more kinematics or one or more features in the source data. In some embodiments, metadata obtained via representation learning can be queried immediately upon generation thereof, and the metadata can be continuously processed and updated. In some embodiments, metadata obtained via decision learning is used to search for usualness, unusualness, or one or more decision features of the cognitive information processing system.

Figure 22:
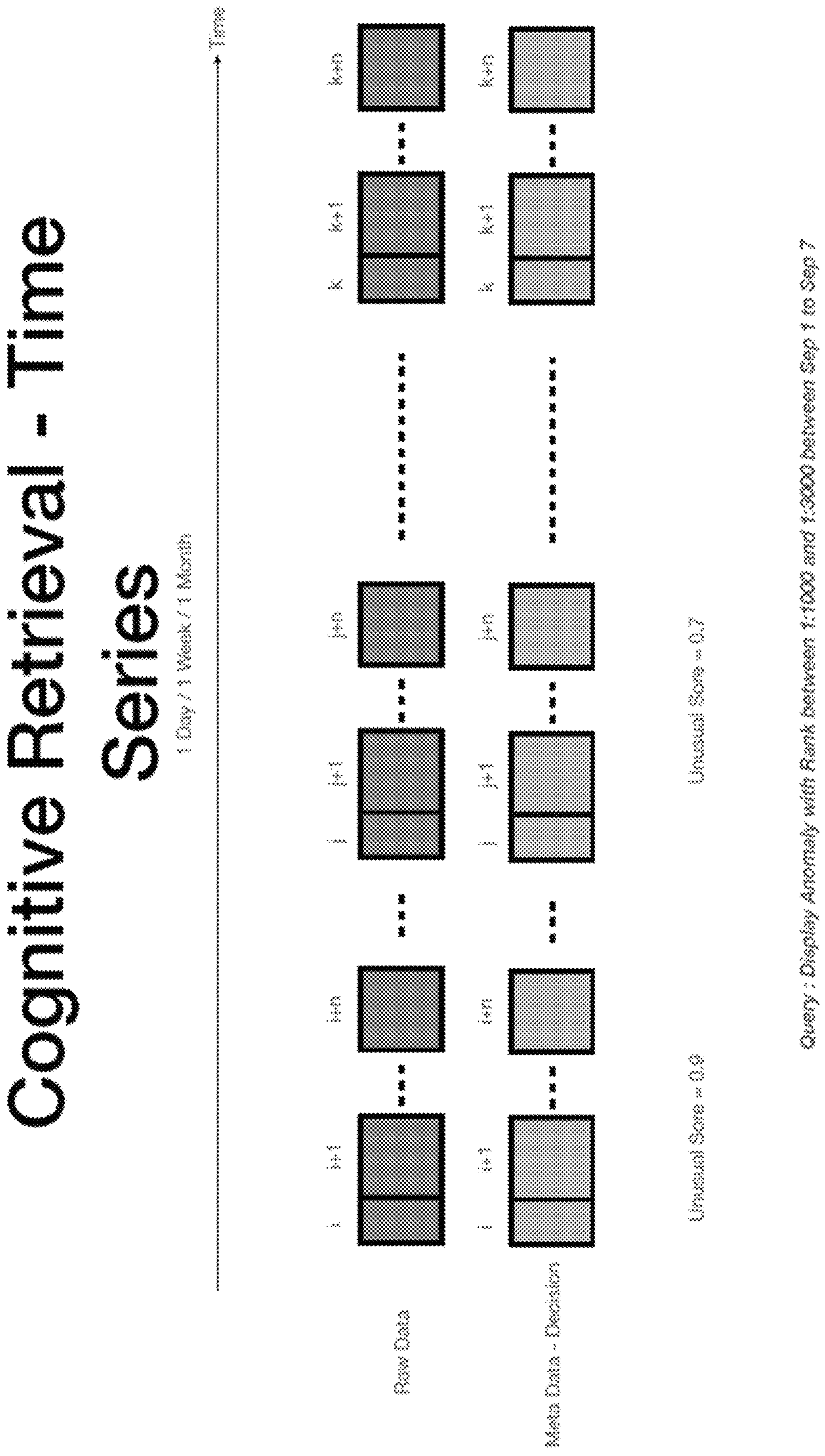
FIG. 22 illustrates a cognitive retrieval process for time series data, according to an embodiment.

FIG. 22 illustrates a cognitive retrieval process for time series data, according to an embodiment. In the example of FIG. 22, a query is being processed on the time series data, the query requesting display of anomalies having a rank between 1:1000 and 1:3000 and between September 1 and September 7. The top row shows a temporal spread of example raw time series data, and the bottom row shows a temporal spread of example metadata associated with the example raw time series data. As shown in FIG. 22, the metadata can include unusualness scores. In some embodiments, metadata from a cognitive information processing system is utilized to rank and organize relevant information such as resource allocation and optimization information. In some embodiments, metadata obtained via representation learning is used to search for one or more features in the source data for, and the one or more features can include statistical data such as high, low, mean, and/or variance data. In some embodiments, metadata obtained via decision learning is used to search for usualness, unusualness, or one or more decision features of the cognitive information processing system.

Figure 23:
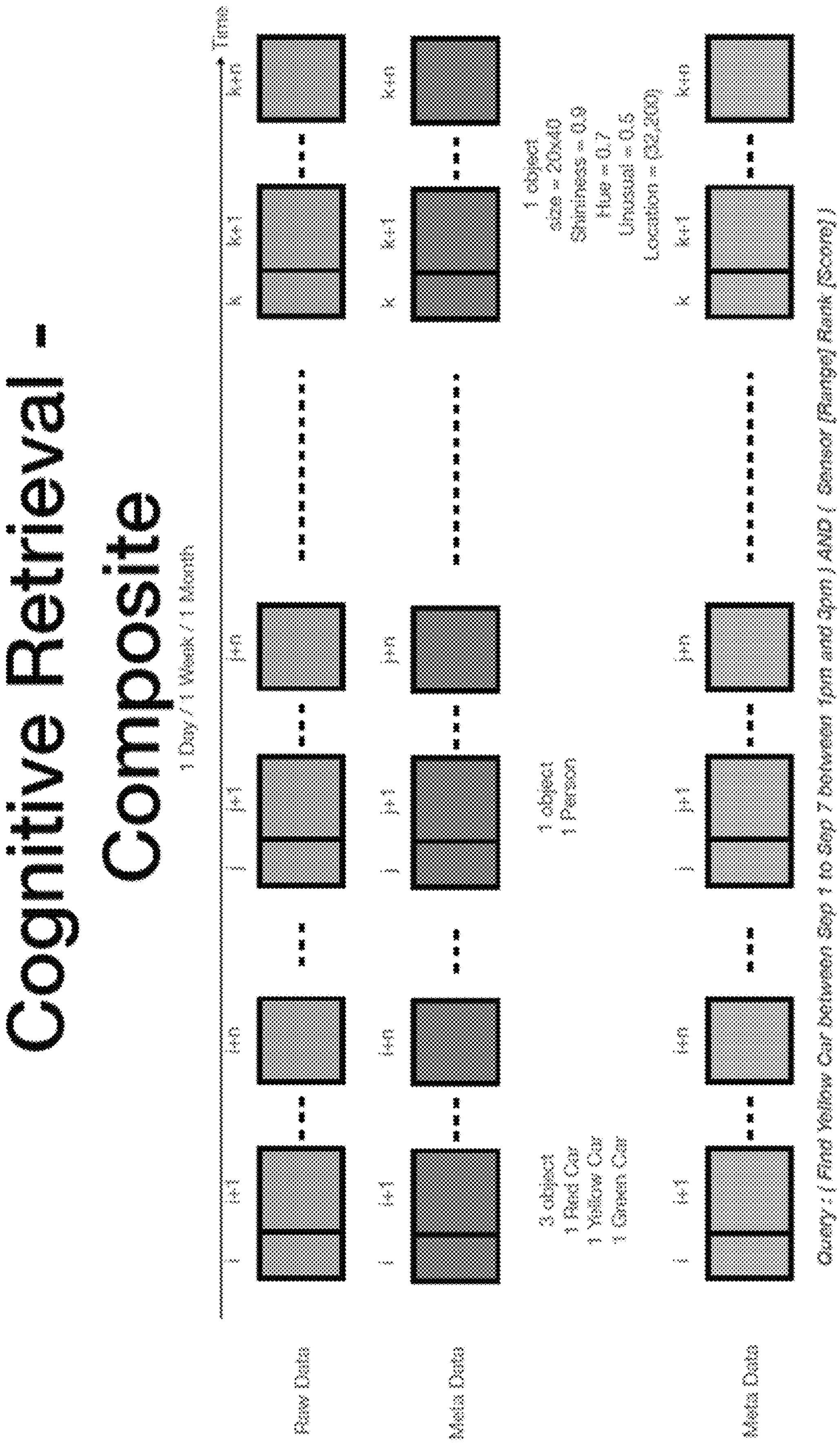
FIG. 23 illustrates a cognitive retrieval process for composite data, according to an embodiment.

FIG. 23 illustrates a cognitive retrieval process for composite data (e.g., including any combination of sensor data, video data, audio data, text data, and/or time series data, etc.), according to an embodiment. In the example of FIG. 23, a query is being processed on the composite data, the query requesting identification of a yellow car between September 1 and September 7, between 1 pm and 3 pm, and with a sensor value within a specified range, and a rank having a specified score. The top row shows a temporal spread of example raw composite data, and the bottom row shows a temporal spread of example metadata associated with the example raw composite data. As shown in FIG. 23, the metadata can include information such as a number of objects in the video (e.g., for a given time period or for a given frame or series of frames), whether a car is detected, whether a person is detected, an object color, object size, object shininess, object hue, object location, and unusualness score. In some embodiments, metadata from a cognitive information processing system is utilized to correlate and/or associate one or more of: (1) one or more metadata from one or more sources, (2) one or more metadata generated via representation learning, and (3) one or more metadata generated via decision learning. Metadata can be fetched, for example, from a sensory memory, which may include an input buffer and/or an output buffer. In some embodiments, metadata generated according to methods set forth herein can be used to determine whether an event or a data set is "normal" or "abnormal." Alternatively or in addition, in some embodiments, metadata generated according to methods set forth herein can be used to determine whether an event or a data set is "super normal" (i.e., occurring more frequently than a normal occurrence rate).

Figure 24:
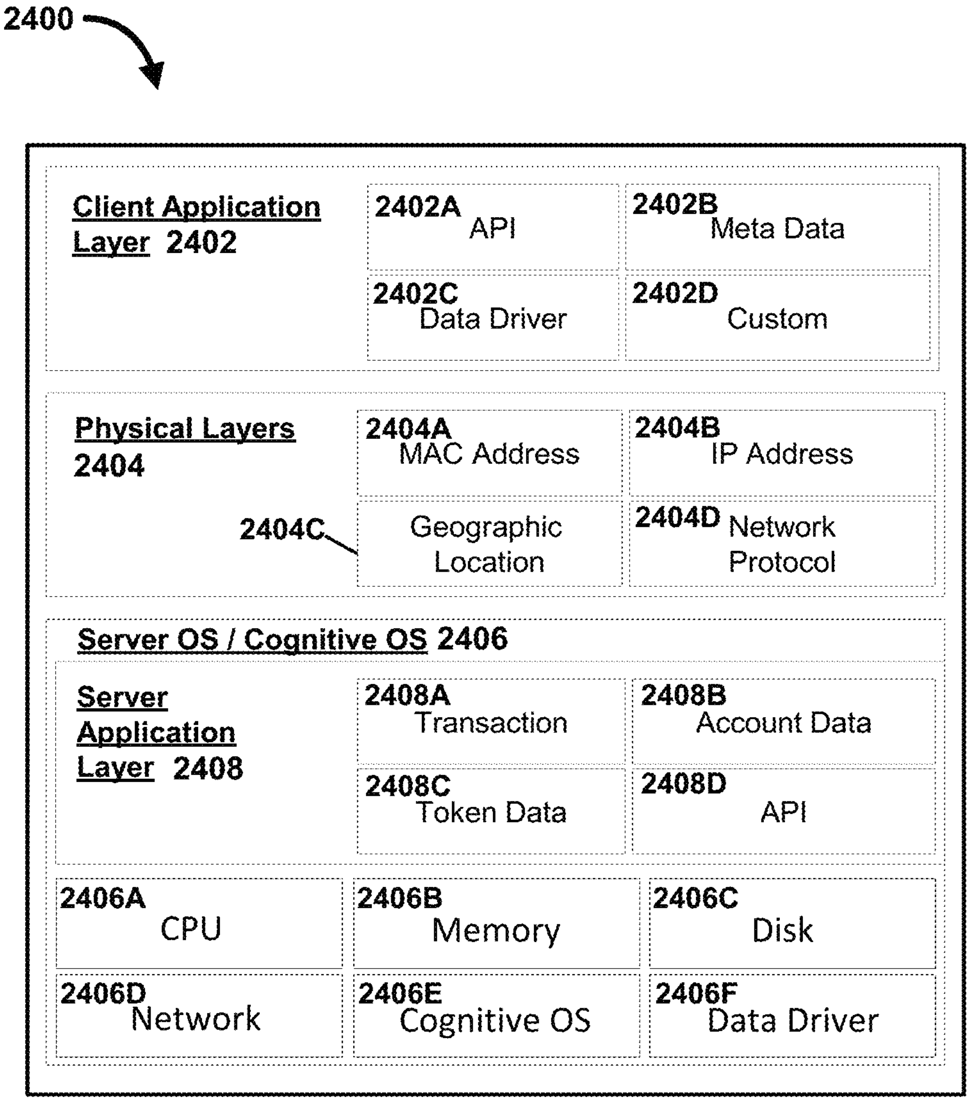
FIG. 24 is a diagram of an example integration framework, according to an embodiment.

FIG. 24 is a diagram of an example integration framework, according to an embodiment. As shown in FIG. 24, the system 2400, which may be implemented in software/code and/or hardware, includes a client application layer 2402, a set of physical layers 2404, and a server operating system (OS) 2406 with a server application layer 2408. The client application layer 2402 includes an application programming interface (API) 2402A, metadata 2402B, one or more data drivers 2402C, and one or more custom functionalities 2402D. The one or more data drivers 2402C can be implemented as a standalone software application in one or more compute devices, including but not limited to, virtual devices (e.g., cloud devices, virtual machines, OS-level virtualization software such as Docker, etc.) or edge devices. As used herein, an "edge device" refers to a device that provides an entry point into a network. Examples of edge devices include routers, routing switches, integrated access devices, multiplexers, and a variety of area network (e.g., wide area network) access devices. The one or more data drivers 2402C can receive and/or process data such as video data, image data, internet of things (IoT) data, and API data. Alternatively or in addition, the one or more data drivers 2402C can extract and/or convert metadata from the data. The API 2402A is configured to at least one of: analyze host application activities (e.g., games, internet applications, internet browsers, blockchain wallets, etc.), or analyze activities such as client/server network interactions and behaviors. The API 2402A can be used to provide integration between a software application and one or more compute devices, such as edge devices, mobile devices such as smart phones, and/or sensors.

The set of physical layers 2404 includes at least one associated media access control (MAC) address 2404A, at least one associated internet protocol (IP) address 2404B, at least one associated geographic location 2404C, and at least one network protocol 2404D. The server OS/Cognitive OS 2406 includes a central processing unit (CPU) 2406A, a memory 2406B, a disk 2406C, at least one associated network 2406D (e.g., a wired communications network and/or a wireless communications network), a cognitive OS 2406E, and a data driver 2406F. The server OS/Cognitive OS 2406 can be configured to analyze the CPU 2406A (e.g., performance thereof), the memory 2406B, the disk 2406C, the at least one associated network 2406D, the cognitive OS 2406E, and/or the data driver 2406F. Alternatively or in addition, the server OS/Cognitive OS 2406 can be configured to detect a health status of hardware such as the CPU 2406A (e.g., performance thereof), the memory 2406B, the disk 2406C, hardware used to access the at least one associated network 2406D, the cognitive OS 2406E, and/or the data driver 2406F. The Server OS can also be configured to monitor the physical layers 2404, which include but are not limited to MAC address 2404A, IP address 2040B, geographic location 2404C, and network protocol 2404D.

The set of physical layers 2404 can be configured to perform Transmission Control Protocol/Internet Protocol (TCP/IP) and/or Open Systems Interconnection model (OSI model) functions. For example, the set of physical layers 2404 can analyze network topology of clients, servers and/or host compute devices within a computing environment. Alternatively or in addition, the set of physical layers 2404 can function as a gateway or network backbone.

The server application layer 2408 includes transaction data 2408A (e.g., received from a blockchain network), account data 2408B (e.g., received from the blockchain network), token data 2408C (e.g., received from the blockchain network), and an API 2408D. In some implementations, the API 2408D is configured to send/receive information such that the sender/receiver can perform one or more of: analyze host application activities, analyze token metadata, analyze transactions, analyze API activity, analyze utilization of network resources, etc. The server OS/Cognitive OS can process data received via the API 2408D and from the blockchain, from a common (i.e., the same) host/IP address on different ports. Alternatively or in addition, the server OS/Cognitive OS can process data received via the API 2408D and from the blockchain, from different hosts/IP addresses on a common (i.e., the same) port or on multiple different ports. Example applications of the server application layer 2408 include blockchain transactions, server applications, Software as a service (SaaS), and platform as a service (PaaS). Alternatively or in addition, the server application layer 2408 can be configured to perform the Meta Data 2402B, the Data Driver 2402C, and Custom 2402D.

Figure 25:
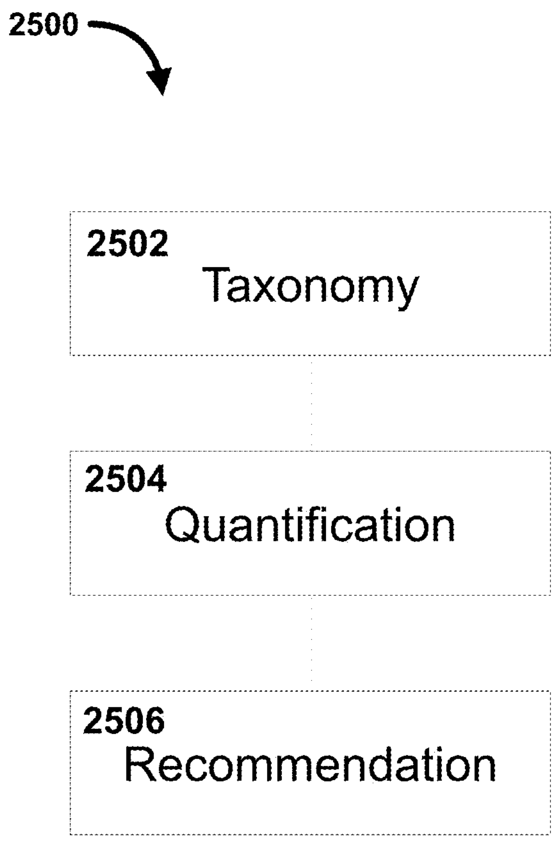
FIG. 25 is a flow diagram showing a cognitive analytics process, according to an embodiment.

FIG. 25 is a flow diagram showing a cognitive analytics process, according to an embodiment. As shown in FIG. 25, the process 2500 includes three stages: taxonomy 2502, quantification 2504, and recommendation 2506. The taxonomy 2502 stage can include building behavioral/cognitive rules based on data received from multiple sensors, for example using cognitive processing (which can include representation learning and/or decision learning). The taxonomy 2502 stage can include learning (e.g., machine learning) by observation, for example by acquiring data ("data acquisition") and constructing a model ("model building") based on the acquired data. The learning by observation can result in the identification of one or more patterns. The taxonomy 2502 stage can also include defining a distribution of normality, for example building a dictionary or lexicon of normal terms, parameters, and/or events. Applications of the taxonomy 2502 stage functions can include "smart city" modeling, network environment modeling, smart contract modeling, and token transaction modeling. The quantification 2504 stage can be performed by one or more codelets to evaluate conditions or to measure to determine whether a certain condition has been triggered. The quantification 2504 stage can include quantification based on learned patterns (e.g., based on patterns learned during the taxonomy 2502 stage and/or based on distributions of probabilities). The quantification 2504 stage can also include computing one or more deviations from one or more predefined normal conditions. The predefined normal conditions can include, for example, a probability distribution associated with one or more behaviors or events, one or more predefined threshold values or ranges, etc. The recommendation 2506 stage can include presenting or causing display of information via a graphical user interface (GUI) so that a user can view it and/or storing the information to a database accessible by the user. The recommendation 2506 stage can include the generation of one or more recommendations (e.g., prompts for display to a user via a GUI, remediation actions, etc.), for example based on patterns learned during the taxonomy 2502 stage and/or based on predicted outcomes associated with a set of candidate recommendations. In addition, the recommendation 2506 stage can include anomaly detection, reporting of detected anomalies, providing/causing display of recommendations for remediating anomalies, event detection, reporting of detected events, providing/causing display of recommendations for actions taken in response to the detected events, similar events detection, reporting of detected occurrences of similar events, etc. Alternatively or in addition, the recommendation 2506 stage can include generating recommendations based on one or more inference probabilities of outcomes. Applications of the recommendation 2506 stage functions can include recommendation systems, anomaly detection, and normal behavior detection.

Figure 26A:
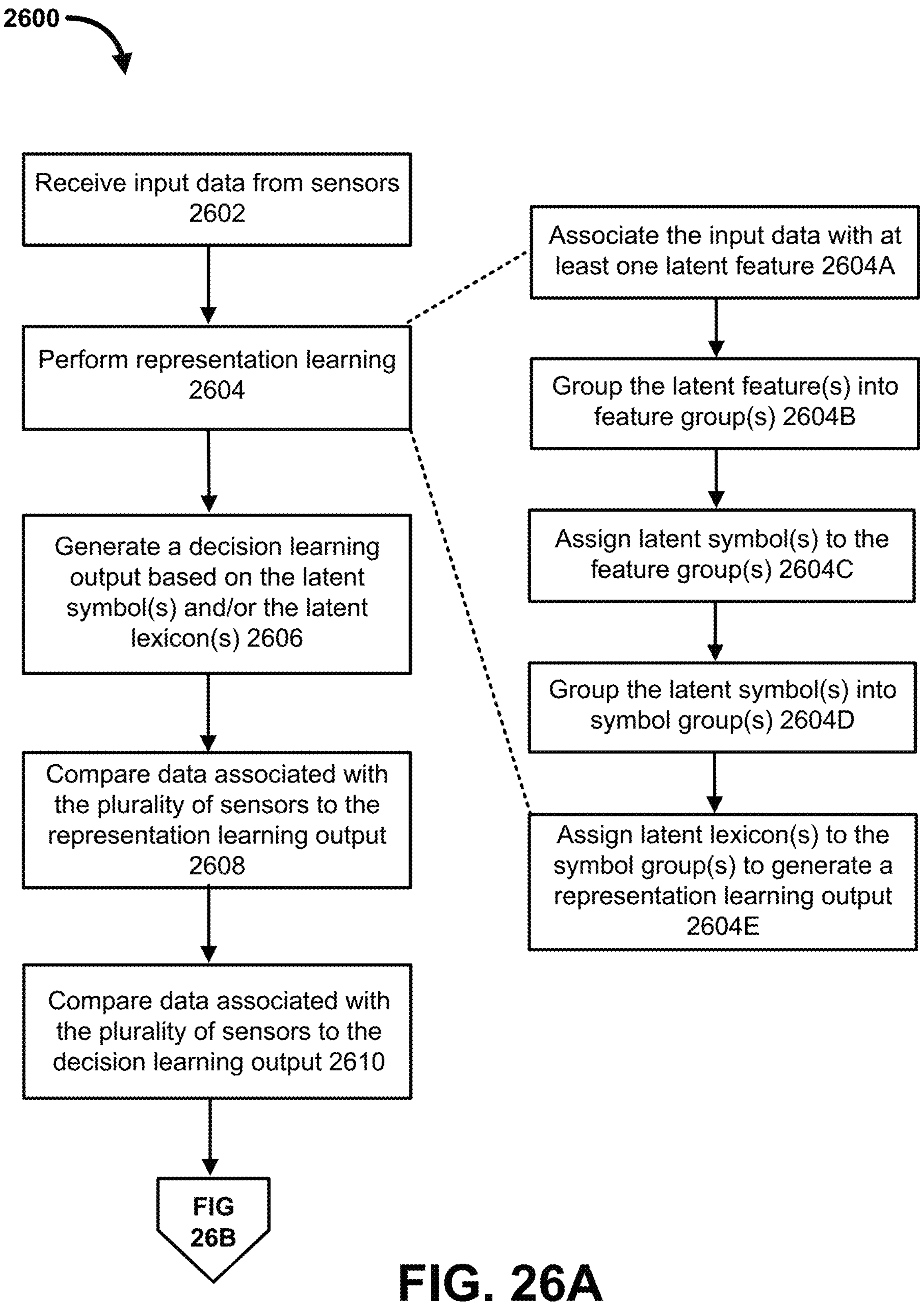
FIGS. 26A-26B show a flow diagram showing a method for implementing a cognitive information processing system, according to an embodiment.
Figure 26B:
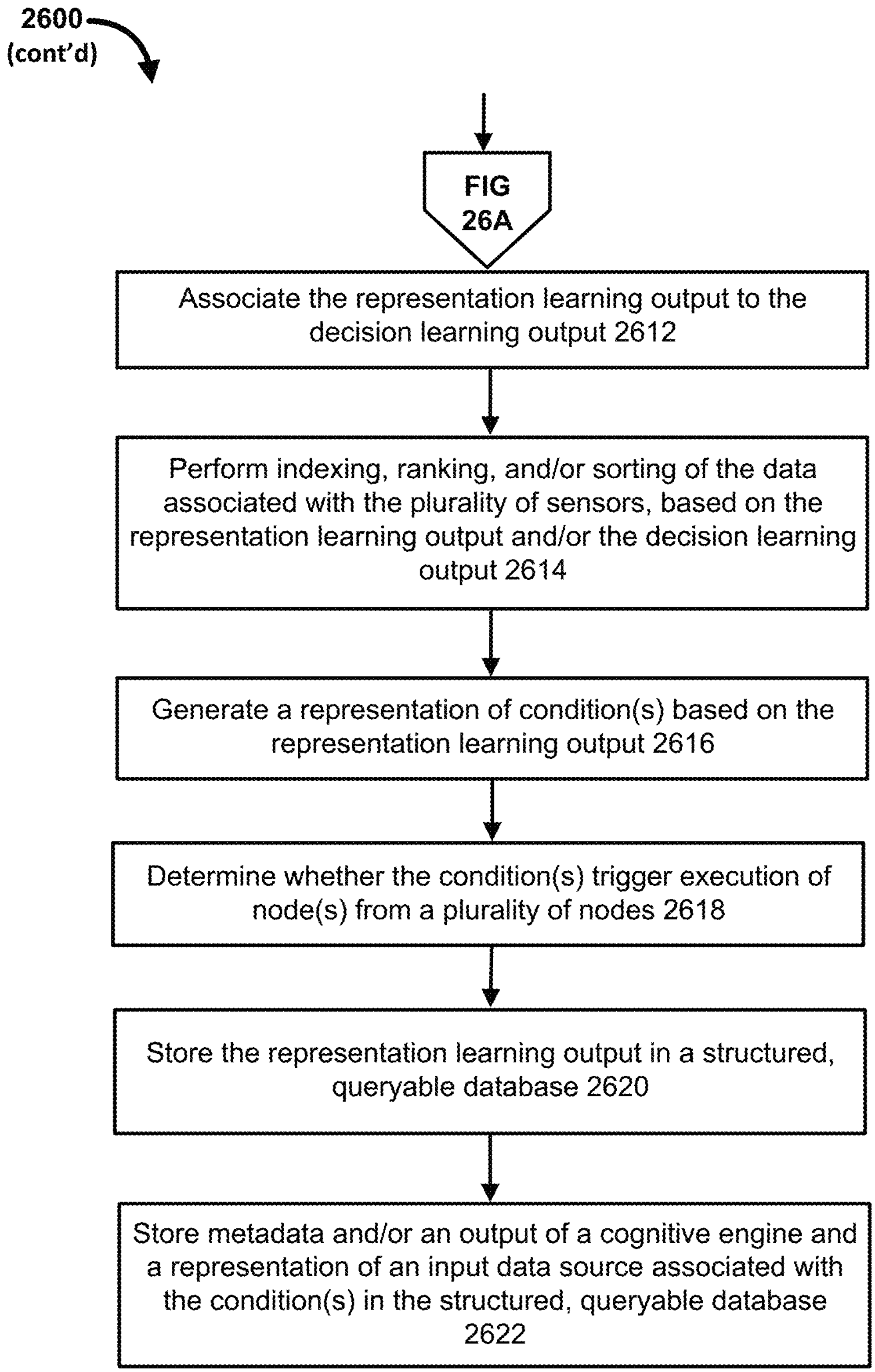

FIGS. 26A-26B show a flow diagram showing a method for implementing a cognitive information processing system, according to an embodiment. The method 2600 of FIGS. 26A-26B can, for example, be an example of actions performed during the taxonomy 2502 stage of FIG. 25. As shown in FIG. 26A, the method 2600 includes receiving input data (e.g., including unstructured data and/or structured data) from a plurality of sensors (e.g., including at least one IoT sensor) at 2602, and performing representation learning at 2604. The performing the representation learning 2604 includes associating the input data with at least one latent feature at 2604A, grouping the at least one latent feature into at least one feature group at 2604B, and assigning at least one latent symbol to the at least one feature group at 2604C. The performing the representation learning 2604 also includes grouping the at least one latent symbol into at least one symbol group at 2604D, and assigning, at 2604E, at least one latent lexicon to the at least one symbol group, to generate a representation learning output. The method 2600 further includes generating a decision learning output at 2606 based on at least one of: the at least one latent symbol or the at least one latent lexicon. At 2608, data associated with the plurality of sensors is compared to the representation learning output, and at 2610, the data associated with the plurality of sensors is compared to the decision learning output.

Transitioning from FIG. 26A to FIG. 26B, the representation learning output is associated with and/or compared to the decision learning output at 2612. As used herein, the phrase "associated with" can refer to storing or causing storage of a representation of a relationship between the two values or parameters being associated with one another. The associating the representation learning output with the decision learning output at 2612 can be based on or in response to the comparisons performed at 2608 and 2610. At 2614, at least one of indexing, ranking, or sorting of the data associated with the plurality of sensors is performed, based on at least one of the representation learning output or the decision learning output, to produce modified data or code. A representation of at least one condition from a plurality of conditions is generated at 2616, based on the representation learning output. At 2618, a determination is made as to whether the at least one condition triggers execution of at least one node from a plurality of nodes, with each node from the plurality of nodes representing a subtask of at least one task from a plurality of tasks associated with the plurality of conditions, and each task from the plurality of tasks including a plurality of subtasks in an order. The representation learning output (and, optionally, the modified data) are stored, at 2620, in a structured, queryable database. Storing the modified data (which may include metadata associated with the sensors) in the queryable database makes the queryable database searchable based, for example, on the indexing of the sensor attributes (e.g., via representation learning), and can trigger alerts (e.g., based on decision learning). Alerts can also be stored in the queryable database, for subsequent retrieval and display (e.g., via a GUI). At least one of (a) metadata associated with the input data or (b) an output of a cognitive engine and (2) a representation of a sensor from the plurality of sensors that is associated with the at least one condition are stored, at 2622, in the structured, queryable database.

In some implementations, the representation learning 2604 is performed using an eutoencoder.

In some implementations, the associating the input data with at least one latent feature, at 2604A, is performed using a self-supervised machine learning method.

In some implementations, each condition from the at least one condition is associated with a cognitive analytics codelet.

In some implementations, the representation learning output includes a learned pattern.

In some embodiments, a system for implementing a cognitive information processing system for association, classification, and recognition includes a processor and a memory. The memory stores instructions that, when executed by a processor, cause the processor to receive input data from a plurality of sensors, and to perform representation learning. The representation learning includes associating the input data with at least one latent feature, grouping the at least one latent feature into at least one feature group, assigning at least one latent symbol to the at least one feature group, grouping the at least one latent symbol into at least one symbol group, and assigning at least one latent lexicon to the at least one symbol group, to generate a representation learning output. The memory also stores instructions that, when executed by a processor, cause the processor to generate a decision learning output based on at least one of: the at least one latent symbol or the at least one latent lexicon. The memory also stores instructions that, when executed by a processor, cause the processor to compare at least one of: (1) data associated with the plurality of sensors to the representation learning output, (2) data associated with the plurality of sensors to the decision learning output, or (3) the representation learning output to the decision learning output. The memory also stores instructions that, when executed by a processor, cause the processor to perform at least one of indexing, ranking, or sorting of the data associated with the plurality of sensors, based on at least one of the representation learning output or the decision learning output, to produce modified data. The memory also stores instructions that, when executed by a processor, cause the processor to generate a representation of at least one condition from a plurality of conditions based on the representation learning output, and determine whether the at least one condition triggers execution of at least one node from a plurality of nodes. Each node from the plurality of nodes can represent, for example, a subtask of at least one task from a plurality of tasks associated with the plurality of conditions, each task from the plurality of tasks including a plurality of subtasks in an order. The memory also stores instructions that, when executed by a processor, cause the processor to store the representation learning output and the modified data in a structured, queryable database, and to store at least one of metadata associated with the input data or an output of a cognitive engine and a representation of an input data source associated with the at least one condition in the structured, queryable database.

In some implementations, the cognitive engine is configured to convert unstructured data into structured data.

In some implementations, the input data includes unstructured data and structured data.

In some implementations, each node from the plurality of nodes is stored in the memory as part of an undirected graph.

In some implementations, the plurality of sensors includes at least one Internet of Things (IoT) sensor.

In some implementations, the representation learning output includes a learned pattern.

In some implementations, each condition from the at least one condition is associated with a cognitive analytics codelet.

In some embodiments, a non-transitory, processor-readable medium stores instructions for implementing a cognitive information processing system for association, classification, and recognition. The instructions can include instructions to cause a processor to receive input data from a plurality of sensors, and to perform representation learning using an autoencoder. The representation learning includes associating the input data with at least one latent feature, grouping the at least one latent feature into at least one feature group, assigning at least one latent symbol to the at least one feature group, grouping the at least one latent symbol into at least one symbol group, and assigning at least one latent lexicon to the at least one symbol group, to generate a representation learning output. The instructions also include instructions to cause the processor to generate a decision learning output based on at least one of: the at least one latent symbol or the at least one latent lexicon. The instructions also include instructions to cause the processor to compare at least one of data associated with the plurality of sensors to the representation learning output, data associated with the plurality of sensors to the decision learning output, or the representation learning output to the decision learning output. The instructions also include instructions to cause the processor to perform at least one of indexing, ranking, or sorting of the data associated with the plurality of sensors, based on at least one of the representation learning output or the decision learning output, to produce modified data. The instructions also include instructions to cause the processor to generate a representation of at least one condition from a plurality of conditions based on the representation learning output, and to determine whether the at least one condition triggers execution of at least one node from a plurality of nodes. The instructions also include instructions to cause the processor to store the representation learning output and the modified data in a structured, queryable database, and to store at least one of metadata associated with the input data or an output of a cognitive engine and a representation of a sensor from the plurality of sensors that is associated with the at least one condition in the structured, queryable database.

In some implementations, the cognitive engine is configured to convert unstructured data into structured data.

In some implementations, each node from the plurality of nodes represents a neuron of a neural network.

In some implementations, the plurality of sensors includes at least one Internet of Things (IoT) sensor.

In some implementations, the representation learning output includes a learned pattern.

In some implementations, each condition from the at least one condition is associated with a cognitive analytics codelet.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms “about” or “approximately” when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles “a” and “an,” as used herein in the specification and in the embodiments, unless clearly indicated to the contrary, should be understood to mean “at least one.”

The phrase “and/or,” as used herein in the specification and in the embodiments, should be understood to mean “either or both” of the elements so conjoined, i.e., elements that are conjunctively present in some cases and disjunctively present in other cases. Multiple elements listed with “and/of” should be construed in the same fashion, i.e., “one or more” of the elements so conjoined. Other elements may optionally be present other than the elements specifically identified by the “and/or” clause, whether related or unrelated to those elements specifically identified. Thus, as a non-limiting example, a reference to “A and/or B”, when used in conjunction with open-ended language such as “comprising” can refer, in one embodiment, to A only (optionally including elements other than B); in another embodiment, to B only (optionally including elements other than A); in yet another embodiment, to both A and B (optionally including other elements); etc.

As used herein in the specification and in the embodiments, “or” should be understood to have the same meaning as “and/or” as defined above. For example, when separating items in a list, “or” or “and/or” shall be interpreted as being inclusive, i.e., the inclusion of at least one, but also including more than one, of a number or list of elements, and, optionally, additional unlisted items. Only terms clearly indicated to the contrary, such as “only one of” or “exactly one of,” or, when used in the embodiments, “consisting of,” will refer to the inclusion of exactly one element of a number or list of elements. In general, the term “or” as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system, comprising:
- a representation learning engine, configured to:
  - receive input data via at least one of a sensor data stream, software-generated telemetry, an internet-based data feed, a source of structured digital content, or a source of unstructured digital data,
  - perform self-supervised clustering, using representation learning, with one or more latent vectors from one or more convolutional neural networks, of features extracted from the input data into a hierarchical set of symbols, using a neuro-symbolic generator, to generate a learned feature language, and
  - encode the input data into at least one latent vector, from the one or more latent vectors, representing at least one pattern in the input data, the at least one latent vector included in the learned feature language; and
- a decision learning engine, configured to:
  - generate, via a plurality of codelets, a plurality of sub-decisions including detection of at least one of spatial anomalies, temporal anomalies, or composite anomalies,
  - selectively execute codelets from the plurality of codelets in response to traversing a graph structure and satisfying associated conditions, each codelet from the plurality of codelets configured to evaluate an expression,
  - modify the graph structure based on an output of at least one executed codelet or an observation retrieved from episodic memory, and
  - store a representation of at least one of the at least one latent vector, the spatial anomalies, the temporal anomalies, the composite anomalies, or the at least one pattern in at least one of a semantic memory, the episodic memory, or a long-term memory,
- the system configured to (1) update the learned feature language based on newly-received input data and data retrieved from the at least one of the semantic memory, the episodic memory, or the long-term memory, and (2) detect in real-time, and respond to, new anomalies.

2. The system of claim 1, wherein the decision learning engine is configured to convert unstructured data into structured data.

3. The system of claim 1, wherein the input data includes the sensor data stream, and the sensor data stream includes data from at least one Internet of Things (IoT) sensor.

4. The system of claim 1, wherein the neuro-symbolic generator is configured to generate at least one of α-symbols, β-symbols, or γ-symbols of variable size.

5. The system of claim 4, wherein the neuro-symbolic generator is configured to generate the β-symbols through the association of α-symbols based on at least one co-occurrence pattern.

6. The system of claim 4, wherein the neuro-symbolic generator is configured to generate the γ-symbols through the aggregation of β-symbols into a representation of at least one statistically significant feature relationship.

7. The system of claim 1, wherein the plurality of sub-decisions further includes at least one of classification, prediction, or condition generation, based on the representations of the at least one of the at least one latent vector, the spatial anomalies, the temporal anomalies, the composite anomalies, or the at least one pattern.

8. The system of claim 1, wherein the graph structure includes an undirected graph having a plurality of nodes, each node from the plurality of nodes representing an ordered plurality of subtasks.

9. A non-transitory, processor-readable medium storing instructions to cause a processor to:
- receive input data via at least one of a sensor data stream, software-generated telemetry, an internet-based data feed, a source of structured digital content, or a source of unstructured digital data;
- perform self-supervised clustering, using representation learning, with one or more latent vectors from one or more convolutional neural networks, of features extracted from the input data into a hierarchical set of symbols, using a neuro-symbolic generator, to generate a learned feature language;
- encode the input data into at least one latent vector, from the one or more latent vectors, representing at least one pattern in the input data, the at least one latent vector included in the learned feature language;
- generate a representation learning output, by:
  - generating, via a plurality of codelets, a plurality of sub-decisions including detection of at least one of spatial anomalies, temporal anomalies, or composite anomalies,
  - selectively executing codelets from the plurality of codelets in response to traversing a graph structure and satisfying associated conditions, each codelet from the plurality of codelets configured to evaluate an expression, modify the graph structure based on an output of at least one executed codelet or an observation retrieved from episodic memory, and storing a representation of at least one of the at least one latent vector, the spatial anomalies, the temporal anomalies, the composite anomalies, or the at least one pattern in at least one of a semantic memory, the episodic memory, or a long-term memory; and at least one of: (1) updating the learned feature language based on newly-received input data and data retrieved from the at least one of the semantic memory, the episodic memory, or the long-term memory, and (2) detecting in real-time, and responding to, new anomalies.

10. The non-transitory, processor-readable medium of claim 9, further storing instructions to cause a processor to convert unstructured data into structured data.

11. The non-transitory, processor-readable medium of claim 9, wherein input data includes the sensor data stream, and the sensor data stream includes data from at least one Internet of Things (IoT) sensor.

12. The non-transitory, processor-readable medium of claim 9, wherein the representation learning output includes a learned pattern.

* * * * *